United States Patent [19]
Cusack et al.

[11] Patent Number: 6,135,760
[45] Date of Patent: *Oct. 24, 2000

[54] METHOD AND APPARATUS FOR CHARACTERIZING A COMBUSTION FLAME

[75] Inventors: Deidre E. Cusack, Groton, Mass.; Keith Stebbings, Bradford, N.H.; Leo Jubinville, Raymond, N.H.; Jonathan Plimpton, Canterbury, N.H.

[73] Assignee: Meggitt Avionics, Inc., Manchester, N.H.

[*] Notice: This patent is subject to a terminal disclaimer.

[21] Appl. No.: 09/223,997

[22] Filed: Dec. 31, 1998

Related U.S. Application Data

[63] Continuation-in-part of application No. 08/985,836, Dec. 5, 1997, which is a continuation of application No. 08/666,042, Jun. 19, 1996, Pat. No. 5,828,797.

[51] Int. Cl.[7] .................................................. F23N 5/08
[52] U.S. Cl. .............................. 431/79; 431/12; 60/39.03
[58] Field of Search .................................. 431/12, 75, 76, 431/79; 340/578; 60/39.03

[56] References Cited

U.S. PATENT DOCUMENTS

| | | |
|---|---|---|
| 3,080,708 | 3/1963 | Carr . |
| 4,455,487 | 6/1984 | Wendt . |
| 4,830,601 | 5/1989 | Dahlander et al. ........................ 431/12 |
| 4,896,965 | 1/1990 | Goff et al. . |
| 5,164,600 | 11/1992 | Das et al. ................................ 250/554 |
| 5,303,684 | 4/1994 | Brown et al. . |
| 5,311,167 | 5/1994 | Plimpton et al. . |
| 5,467,185 | 11/1995 | Engeler et al. . |
| 5,480,298 | 1/1996 | Brown . |
| 5,487,266 | 1/1996 | Brown . |
| 5,612,676 | 3/1997 | Plimpton et al. . |
| 5,785,512 | 7/1998 | Cormier .................................... 431/79 |

FOREIGN PATENT DOCUMENTS

| | | |
|---|---|---|
| 0677706 | 10/1995 | European Pat. Off. . |
| 4025808 | 1/1991 | Germany ................................. 431/79 |
| 004025909 | 7/1991 | Germany ................................. 431/79 |
| 4025909 | 7/1991 | Germany ................................. 431/79 |
| 1138022 | 6/1986 | Japan ...................................... 431/79 |
| 240027 | 10/1986 | Japan ...................................... 431/79 |
| 62-98117 | 5/1987 | Japan ...................................... 431/79 |
| 62-276326 | 12/1987 | Japan ...................................... 431/79 |
| 61-128022 | 6/1988 | Japan ...................................... 431/79 |
| 61-240027 | 11/1988 | Japan ...................................... 431/79 |
| 1068665 | 1/1984 | U.S.S.R. ................................. 431/79 |
| 2204428 | 11/1988 | United Kingdom ..................... 431/79 |
| WO 92/10705 | 6/1992 | WIPO ..................................... 431/79 |
| WO 92010705 | 6/1992 | WIPO ..................................... 431/79 |
| WO 94/08228 | 4/1994 | WIPO . |

OTHER PUBLICATIONS

Janos M. Beer, et al., Individual Burner Air/Fuel Ratio Control Optical Adaptive Feedback Control System, Jan. 1982, pp. 1–62 and Appendix A–1 to A–8.

(List continued on next page.)

*Primary Examiner*—Carl D. Price
*Attorney, Agent, or Firm*—Wolf, Greenfield & Sacks, P.C.

[57] ABSTRACT

Characteristics of a flame within a turbine or burner are determined based upon ultraviolet, visible, and infrared measurements of the flame. The measurements include a measurement of the amplitude of frequency bands that are indicative of an efficient combustion process, such as those that increase when the flame temperature increases. The measurements also include of the amplitude of frequency bands that are indicative of an inefficient combustion process, such as those that do not vary, increase a relatively small amount, or decrease when the flame temperature increases. The temperature of the flame may therefore be determined accurately, to facilitate efficient operation of the turbine or burner while minimizing polluting emissions. Contaminants in the turbine or burner are detected, and a degree of contamination measured, by detection of energy levels for particular wavelengths associated with a respective contaminant.

43 Claims, 25 Drawing Sheets

OTHER PUBLICATIONS

Silicon Carbide Ultraviolet Photodetector Chip 1mm Die Size CD 260–1.00–D, CREE Research Inc.

Thin Film Thermopile Detectors, Jul. 22, 1996, Meggitt Avionics Inc. ABB Stal launch GTX100 at 43 MW with dual fuel DLE capability, May/Jun. 1997, International Turbomachinery.

A New Member of the ABB High–Performance Gas Turbine Family, ABB Stal Ab.

James A. Harrington, Crystalline and Hollow Infrared Fiber Optics, Fiber Optic Materials Research Program, Rutgers University, NJ.

Y. Matsuura et al., Optical propreties of small–bore hollow glass waveguides, Oct. 20, 1995, pp. 6842–6846, Applied Optics.

C.C. Gregory et al., Attenuation, modal, and polarization roperties of n o← 1, hollow dielectric waveguides, Sep. 20, 1993, pp. 5302–5309, Applied Optics.

James A. Harrington et al., Hollow sapphire fibers for the delivery of $CO_2$ laser energy, 1990, pp. 541–543, Optical Society of America.

Rick K. Nubling et al., Optical properties of single–cyrstal sapphire fibers, pp. 1–30, Fiber Optic Materials Research Program, Rutgers University, Piscataway, NJ.

Dale M. Brown et al., SiC Flame Sensors for Gas Turbine Control Systems, pp. X–23 to X–28.

| ELEMENT | EMISSION LINES (nm) | RELATIVE STRENGTH |
|---|---|---|
| BARIUM | 455 | 65000 |
| CHLORIDES | 479 | 99000 |
|  | 542 | 99000 |
|  | 490 | 81000 |
| COPPER | 331 | 25000 |
| LEAD | 406 | 95000 |
| MANGANESE | 403 | 27000 |
|  | 403.3 | 19000 |
| SODIUM | 588.9 | 80000 |
|  | 589.5 | 40000 |
| VANADIUM | 438 | 12000 |

*Fig. 16*

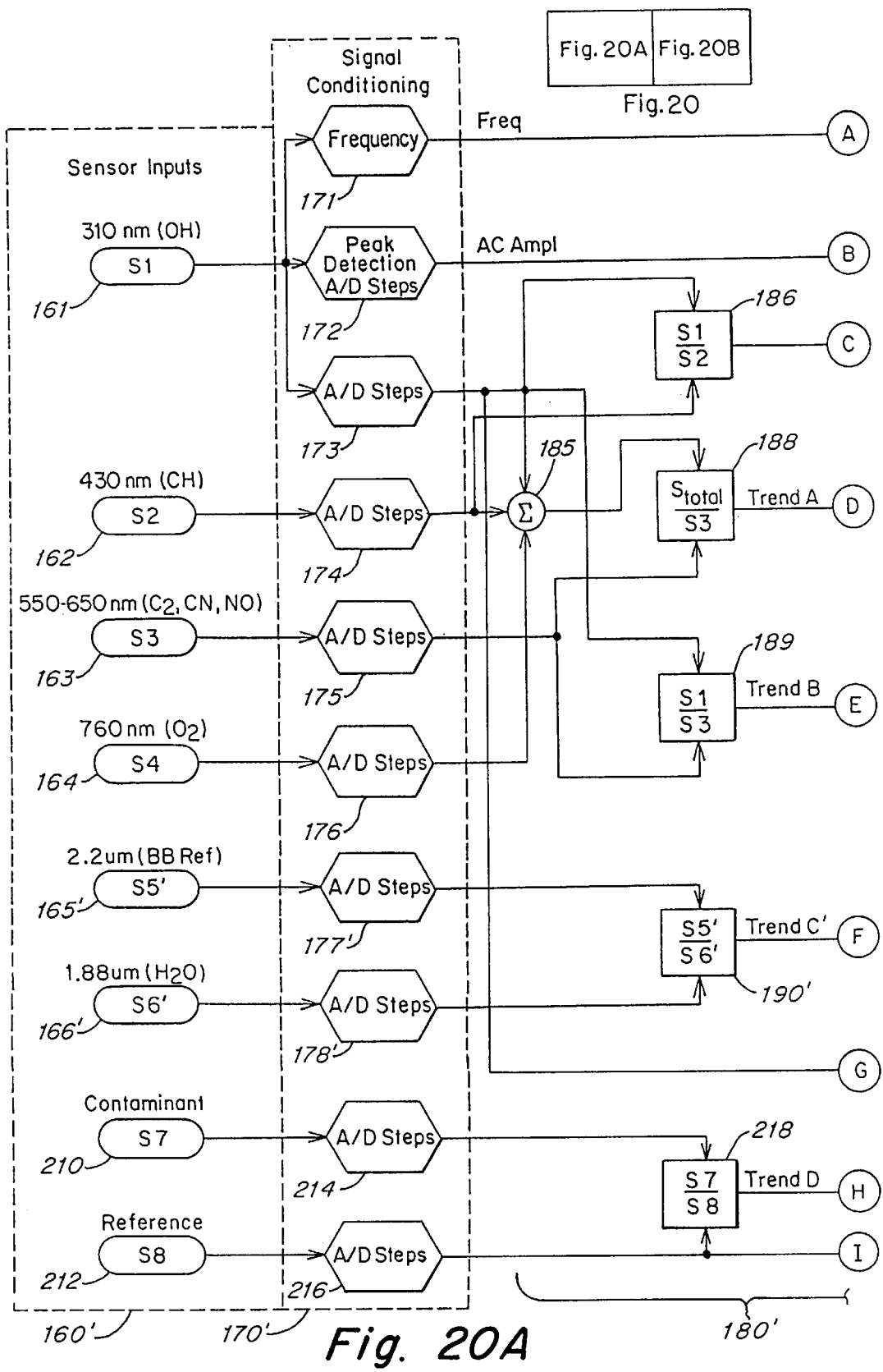

METHOD AND APPARATUS FOR CHARACTERIZING A COMBUSTION FLAME

RELATED APPLICATIONS

This application is a continuation-in-part of Ser. No. 08/985,836 filed Dec. 5, 1997 and presently pending which is a continuation of Ser. No. 08/666,042, filed Jun. 19, 1996 and which is issued as U.S. Pat. No. 5,828,797 on Oct. 27, 1998.

BACKGROUND

1. Field of the Invention

This invention relates generally to turbine and burner control, and more particularly to characterizing a combustion flame within a turbine or burner to facilitate control of the turbine or burner, and to detecting contaminants in fuel used in the turbine or burner.

2. Discussion of the Related Art

Turbines and burners are used to produce power from gas fuel and liquid fuel. generally, turbines are characterized as power-producing devices that operate at a high internal pressure, while burners operate at atmospheric pressure.

FIG. 1 depicts a turbine system for producing power. Although a turbine system is described below, the concepts are equally applicable to burner systems, and therefore it should be understood that the term "turbine" as used in this disclosure also refers to burners.

FIG. 1 shows a turbine 10 coupled to a turbine controller 11. The turbine 10 receives air 22 via air inlet 12, receives fuel 23 via fuel inlet 13, generates power 24 at power output 14, and emits exhaust 25 at exhaust outlet 15. Typically, the exhaust outlet 15 is coupled to an input 26 of an exhaust stack 27. The exhaust stack 27 may include additional inputs 28 that receive exhaust 29 from other turbines. An air flow probe 16 is coupled to the air inlet 12 and also coupled to the turbine controller 11. Additionally, a fuel flow probe 17 is coupled to the fuel inlet 13 and also coupled to the turbine controller 11. Although the air flow probe 16 and fuel flow probe 17 are each depicted in FIG. 1 as being external to the turbine 10, either or both may instead be disposed internal to the turbine 10 or anywhere along the respective path of air flow or fuel flow. The turbine system may further include a pressure probe 18 and a number of external thermocouples 19, each of which is coupled to both the turbine 10 and turbine controller 11. External thermocouples 19 typically provide temperature measurements of the fuel 23, exhaust 25, turbine surface, and the like.

In operation, the turbine controller 11 receives measurements from the turbine sensors (e.g., air flow probe 16, fuel flow probe 17, pressure probe 18, and external thermocouples 19), and provides control signals 42 to control the operation of the turbine 10 according to a desired operating mode. Examples of control signals 42 include signals that control injectors within the turbine, signals that control the amount of fuel input to the turbine 11, signals that control an air/fuel ratio within the turbine, and other control signals as known in the art.

On Nov. 15, 1990, the Clean Air Act Amendments of 1990 (CAA) were enacted (Public Law 101-549, 104 Stat. 2399, codified at 42 U.S.C. 7401–7671q.) The second phase of the Clean Air Act requires that every industrial facility be controlled to emanate less than a predetermined amount of Nitrogen Oxide Compounds (NOx). The air quality planning requirements for the reduction of NOx emissions through reasonably available control technology (RACT) are set out in § 182(f) of the CAA, which is incorporated by reference in its entirety.

On Nov. 25, 1992, the EPA published "State Implementation Plans; Nitrogen Oxides Supplement to the General Preamble; Clean Air Act Amendments of 1990 Implementation of Title I; Proposed Rule," (The NOx Supplement) which describes and provides preliminary guidance on the requirements of § 182(f), and is also incorporated by reference in its entirety. Such requirements present a particular challenge to owners and operators of combustion turbines and burners. To meet the requirements of the Clean Air Act, it is necessary to determine the NOx content of the exhaust. Typically, compliance with the Clean Air Act is determined by measuring the content of exhaust that passes through an industrial plant's exhaust stack. If the measurement indicates too much of any chemical, it is generally necessary to take additional steps to achieve compliance with the Clean Air Act. For example, the exhaust stack may be modified to increase the height at which it emanates. Alternatively, or in combination, post-exhaust devices may be added to reduce the pollution content of the exhaust. These devices typically add to the operating and maintenance cost of the industrial plant. If the requirements of the Clean Air Act cannot be met by any of these approaches, the Clean Air Act includes a provision by which an industrial plant may purchase or otherwise obtain the right to emanate at a higher rate than other organizations.

Generally, however, it is desirable to control the contributing turbines or burners to operate more efficiently. One manner in which to improve the operating efficiency is to operate the turbine or burner at an optimized combustion flame temperature. In such a manner, an industrial plant may meet the requirements of the Clean Air Act, reduce pollution, and increase the overall efficiency of the turbine or burner, by, for example, reducing operating costs by reducing the amount of fuel utilized.

Many industrial facilities include an exhaust stack that passes the combined exhaust from several turbines and burners. In such cases it is difficult to determine the flame quality of any one of the contributing turbines or burners because the several exhausts have been combined and passed through the exhaust stack. Thus, the characteristics of the combined exhaust cannot be easily attributed to any particular contributing turbine or burner.

Additionally, even in an arrangement in which a single exhaust stack is used for a single turbine or burner, measurements made at the exhaust stack are generally unsuitable for feedback control of the turbine or burner because of the delay in feedback and the poor accuracy of such measurements.

A temperature probe may be positioned close to the exhaust of each turbine in order to provide an approximate indication of the combustion flame temperature. Such an arrangement, however, is quite susceptible to leakage into or out of the exhaust path that will, in turn, affect the quality of any measurements made by such a probe. Furthermore, the combustion flame temperature must be back calculated in such an arrangement, which often yields a temperature characterization of questionable accuracy.

Moreover, some turbine systems include a plurality of burners that share a single exhaust. For example, the GTX100 gas turbine, available from ABB STAL AB of Finspong Sweden, includes a plurality of individual combustion burners, each of which contributes to a single exhaust diffuser. The exhaust diffuser is connectable to an exhaust stack or a waste heat recovery unit that may be controlled to further reduce emissions. Any single measurement, however, made at the exhaust diffuser represents only the aggregate performance of all of the plurality of individual combustion burners. In such an arrangement, it is difficult to determine individual burner flame quality based upon the single shared exhaust. This arrangement provides a particular challenge for individually tuning the performance of an individual combustion burner, or performing fault isolation on an individual combustion burner if it is suspected that one may have failed.

Direct measurement of combustion flame temperature is generally not implemented because most known thermocouples cannot survive the high temperature environment within the combustion chamber of a turbine. Moreover, the response time of known thermocouples is in the region of two seconds, which is usually longer than desirable for the purpose of the turbine controller providing control signals in a timely manner to efficiently control the turbine.

In addition to controlling the operation of a turbine or burner to control noxious emissions, it is also important to control the amounts of contaminants within the turbine. Excessive amounts of contaminants can seriously damage components of the turbine. Some contaminants, in combination with the high operating temperature environment, can corrode and erode components, such as turbine blades, or anything located in the hot section, leading to improper operation. As these components are very expensive, anything that can be done to detect excessive contaminant levels will directly result in cost savings.

Most contaminants in a turbine or burner come from the contaminants introduced by the fuel that is being burned. Many substances are allowed in fuel in specified low levels but not at high levels that could lead to corrosion or scaling. Thus, it is known to measure the contaminant levels in the fuel being used. One method of measurement is the detection of discrete frequency bands associated with the specified emission lines for known elements. One such method is taught by Goff et. al. in U.S. Pat. No. 4,896,965 entitled "Real-Time Alkali Monitoring System" issued Jan. 30, 1990. Goff teaches a fiber optics based optical emission line monitoring system used to detect spectral emission lines for particular contaminants, for example, sodium.

A sample of the process stream is diverted to a combustion burner where it is combusted to produce flame emissions. The flame emissions are then analyzed at the wavelength of the contaminant of interest. As Goff has calibrated the operation of this sample combustion chamber, the intensity at a particular wavelength is indicative of a contamination level.

Goff has calibrated the sample combustion chamber so that the only unknown variables in its operation are the contaminant levels in the fuel that is being burned. This sample combustion chamber is not operating under varying load conditions or with changing fuel rates. Thus the teachings of Goff are not applicable to monitoring the combustion flame in a combustor operating under varying real-world operating conditions. The changes in load and fuel would render the calibrated measurements of Goff meaningless when monitoring an actual load-bearing combustion flame. Additionally, as Goff is only measuring the contaminants in the fuel, it is not measuring a contamination level in the combustor that was the result of continuous use of fuel.

Accordingly, an apparatus and method are needed to monitor the contaminant levels in a load-bearing combustor (turbine or burner) in real-time.

SUMMARY OF THE INVENTION

An embodiment of the present invention characterizes a flame within a turbine or burner based upon ultraviolet energy, visible energy, and/or infrared energy measurements of the flame. Measurements are made of the amplitude of frequency or wavelength bands that are indicative of an efficient combustion process, such as those that increase when the flame temperature increases. The measurements also include measuring the amplitude of frequency bands that are indicative of an inefficient combustion process, such as those that do not vary, those that increase a relatively small amount, or those that decrease when the flame temperature increases. The temperature of the flame may therefore be determined accurately, to facilitate efficient operation of the turbine or burner while minimizing polluting emissions.

One particular embodiment of the present invention is directed to a system for characterizing a combustion flame, comprising a first sensor having an input that receives energy within a first wavelength band of the flame, and an output that provides a first signal indicative of an amplitude of the energy within the first wavelength band; a second sensor having an input that receives energy within a second wavelength band of the flame, different from the first wavelength band, and an output that provides a second signal indicative of an amplitude of the energy within the second wavelength band; and a flame characterization module having a first input coupled to the output of the first sensor, a second input coupled to the output of the second sensor, and an output that provides a figure of merit that characterizes the combustion flame as a function of at least a ratio of the first signal to the second signal.

Yet another embodiment is directed to a method of detecting an amount of a contaminant in an enclosure, comprising detecting a first amplitude of energy within a first wavelength band of a first width centered about an emission wavelength of the contaminant; detecting a second amplitude of energy within a second wavelength band of a second width larger than the first width, the second wavelength band also centered about the emission wavelength of the contaminant; determining a ratio of the first amplitude of energy to the second amplitude of energy; and comparing the ratio to a known threshold to determine the amount of contaminant in the enclosure.

Still yet another embodiment is directed to an apparatus for detecting an amount of a contaminant in an enclosure, the apparatus comprising a first detector to detect a first amplitude of energy within a first wavelength band of a first width centered about an emission wavelength of the contaminant; a second detector to detect a second amplitude of energy within a second wavelength band of a second width larger than the first width, the second wavelength band also centered about the emission wavelength of the contaminant; a calculator to calculate a ratio of the first detected amplitude of energy to the second detected amplitude of energy; and a comparator to compare the calculated ratio to a known threshold to determine the amount of contaminant in the enclosure.

BRIEF DESCRIPTION OF THE DRAWINGS

FIG. 16 is a table showing the emission line wavelengths of some known contaminants;

DETAILED DESCRIPTION

Figure 1:
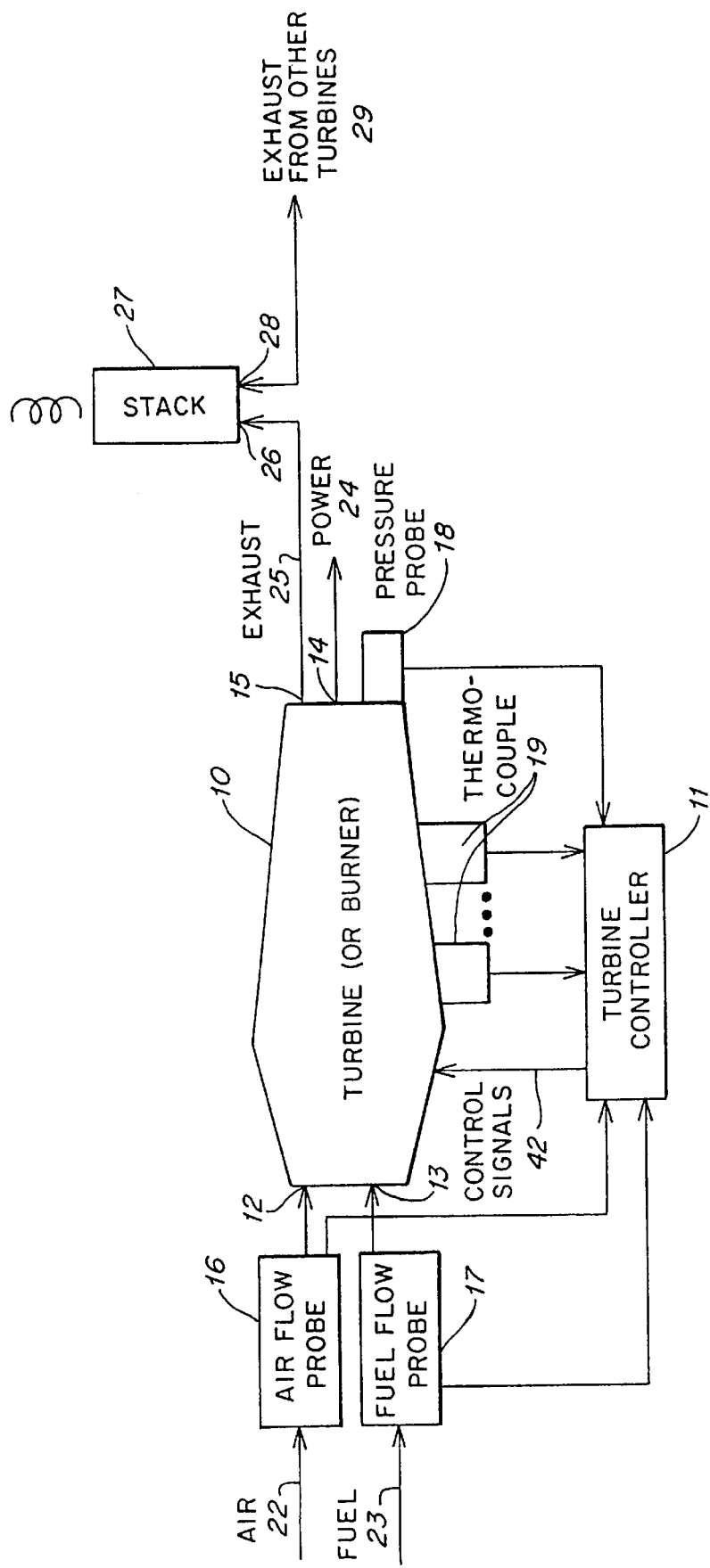
FIG. 1 is a block diagram of a turbine or burner system in which a turbine is controlled by a turbine controller.
Figure 2:
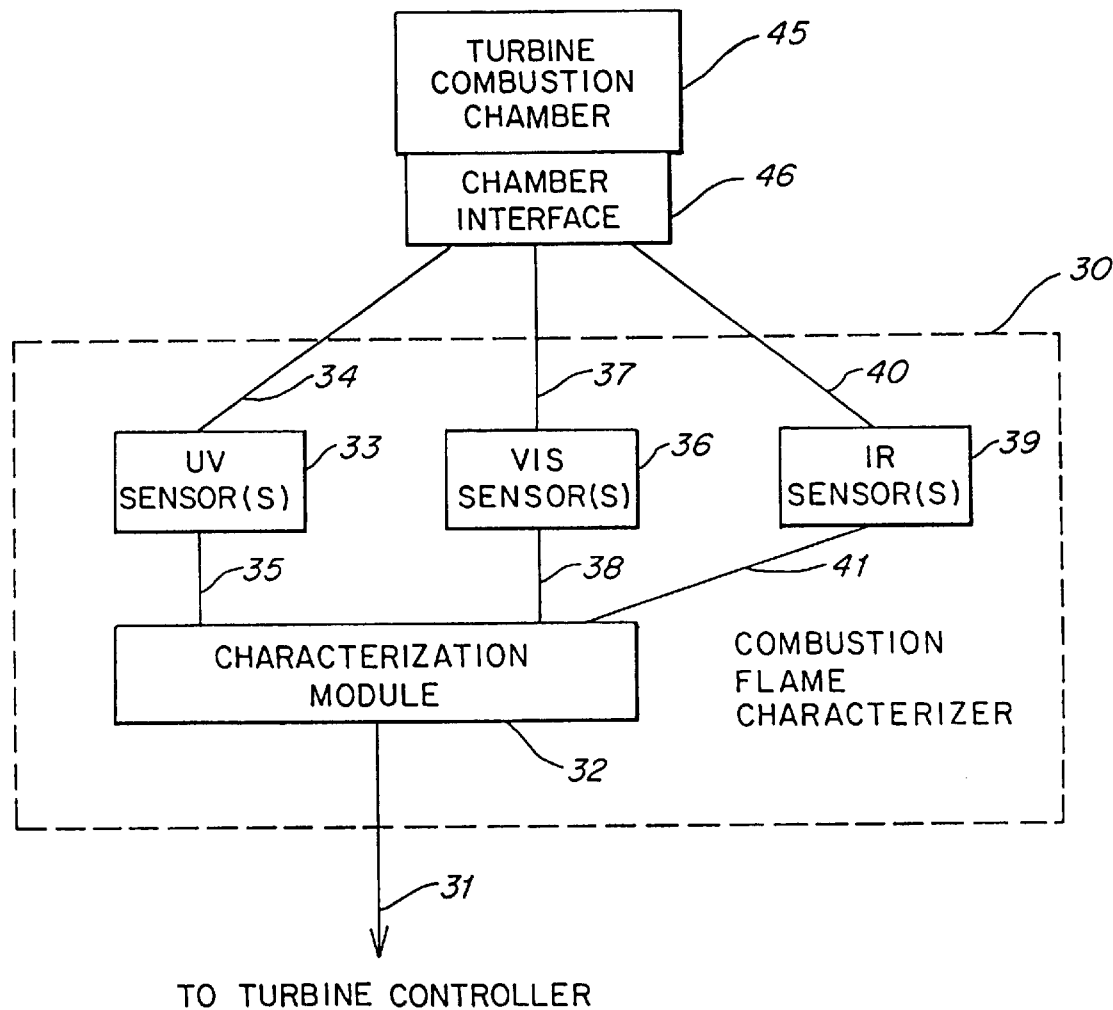
FIG. 2 is a block diagram of an embodiment of the invention including a combustion flame characterizer and sensors.

FIG. 2 depicts an aspect of the invention that facilitates control of a turbine by a turbine controller. In particular, FIG. 2 depicts one embodiment of a combustion flame characterizer 30 coupled to a turbine combustion chamber 45 and also to a turbine controller (not shown). The turbine controller to which characterizer 30 is coupled may be similar to the turbine controller 11 depicted in FIG. 1, but is constructed and arranged to receive the output 31 of characterizer 30 and to process data provided by output 31. The combustion flame characterizer 30 is coupled to the turbine combustion chamber 45 via a chamber interface 46, which may take any of several forms. In one embodiment chamber interface 46 is an optical port having high temperature and high pressure characteristics, disposed at the skin (outer surface) of the turbine. In another embodiment the chamber interface 46 includes a fuel injector port within the turbine combustion chamber 45.

Although industrial plant turbine systems are described herein, the concepts are also applicable to aerospace turbine control techniques such as, for example, control of jet engines. Additionally, although turbine control with respect to reduced emissions is disclosed, the concepts are also applicable to flameout detection and flashback detection. Flameout is a situation in which the flame within the turbine ceases to exist, and it is desirable to quickly cease fuel input, for example within 100 mS. Flashback is a situation in which the flame explodes or otherwise propagates backward, for example, into a pre-mix zone of a turbine, and should also be detected quickly.

As shown in FIG. 2, combustion flame characterizer 30 includes a characterization module 32 that provides the output directly or indirectly to the turbine controller. The characterizer 30 further includes: UV (ultraviolet) sensor(s) 33 having an input 34 coupled to the chamber interface 46 and an output 35 coupled to the characterization module 32; VIS (visible) sensor(s) 36 having an input 37 coupled to the chamber interface 46 and an output 38 coupled to the characterization module 32; and IR (infrared) sensor(s) 39 having an input 40 coupled to the chamber interface 46 and an output 41 coupled to the characterization module 32. The sensors 33, 36, 39 may be disposed directly at the chamber interface 46, or may be remotely positioned as discussed in more detail below.

In operation, the sensors 33, 36, and 39 provide frequency characteristics of a flame within the turbine combustion chamber 45 to the characterization module 32. The module 32 evaluates the frequency characteristics to provide particular flame characterizations to the turbine controller, in order to control the turbine. For example, since flame temperature is often related to the amount of NOx emissions, one approach is to determine a figure of merit that correlates to flame temperature based on the sensed frequency characteristics, so that the turbine controller can tune the various turbine controls to optimize flame temperature.

Figure 2A:
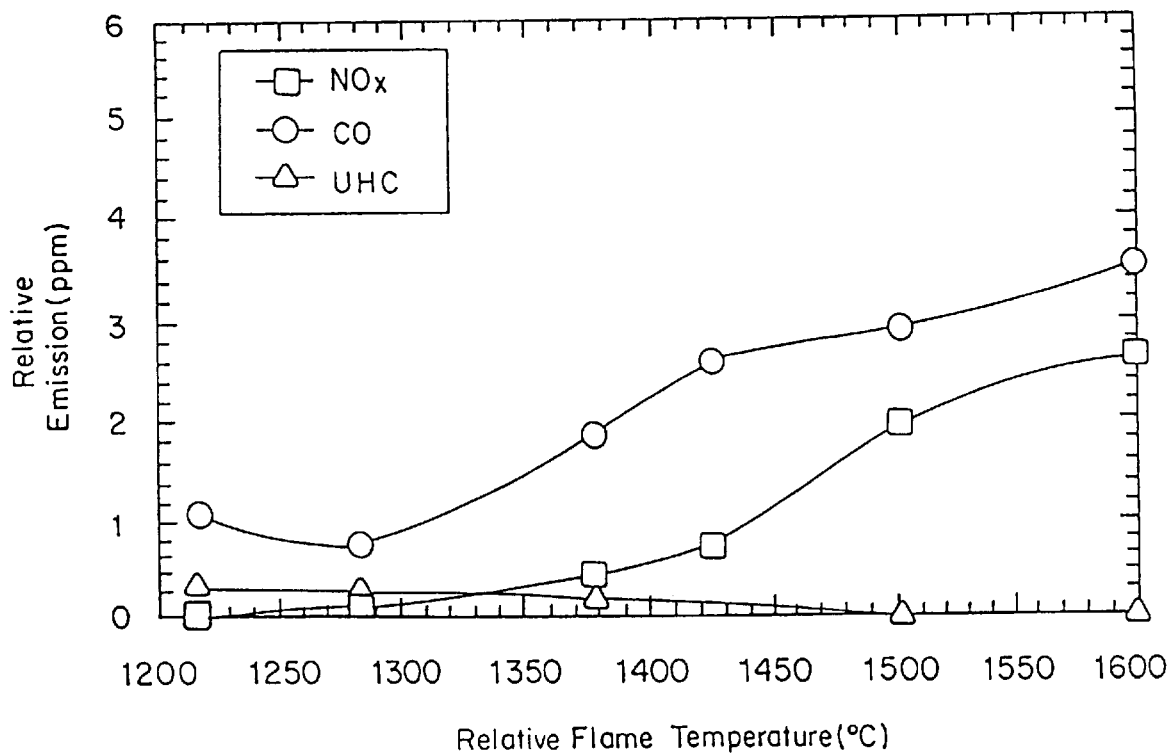
FIG. 2A is a graph showing the relationship in parts per million (ppm) of several pollutants as compared with flame temperature.

FIG. 2A is a graph showing the relationship in ppm (parts per million) of each of NOx, carbon monoxide (CO), and unburned hydrocarbons (UHC), as compared to the relative flame temperature in degrees Celsius (° C.) of a Methane-burning turbine having an inlet temperature of 400° C. As seen from FIG. 2, the amount of NOx generally increases with an increase in temperature, while the amount of CO has a minima at approximately 1275° C., and the amount of UHC generally decreases with an increase in temperature. Generally, it is desirable to minimize the amount of each of NOx, CO, and UHC. However, it is important to optimize the flame temperature in a manner that does not significantly increase the risk of flameout and flashback, both of which are more likely in a flame of lower temperature operating in a lean burn mode of combustion.

Although optimizing flame temperature generally decreases the amount of NOx emissions, increased flame temperature may increase maintenance costs because higher temperatures generally cause more failures of system components. Thus, it is advantageous to provide a figure of merit by which a particular flame temperature or range of flame temperatures can be optimized via the turbine controller.

The sensors 33, 36, and 39 are advantageously selected to measure desired flame characteristics. For example the sensors may include some frequency bands that vary predictably in response to a variation in flame temperature. Additionally, the sensors may sense some frequency bands that vary less than others, and some that are not indicative of any particular species. A more detailed discussion which may assist in the selection of frequency bands is disclosed by James M. Beer, Malcolm T. Jacques, and J. Derek Teare in "Individual Burner Air/Fuel Ratio control Optical Adaptive Feedback Control System," (MIT Energy Laboratory Report No. MIT-EL 82-001), dated January 1982, which is hereby incorporated by reference in its entirety.

Several concepts relating to IR and UV detection are disclosed in U.S. Pat. No. 4,455,487, issued Jun. 19, 1984 to Roger A. Wendt, entitled "FIRE DETECTION SYSTEM WITH IR AND UV RATIO DETECTOR," which is hereby incorporated by reference in its entirety.

In accordance with one embodiment of the present, seven different frequency bands of energy are measured by the sensors 33, 36, and 39. The frequency bands, referred to herein by the name of the material represented by the associated wavelength, include a hydroxyl (OH) band, a CH band, an oxygen ($O_2$) band, a carbon dioxide ($CO_2$) band, a $H_2O$ and $CO_2$ band, an IR blackbody band, and a visible blackbody band. A description of each follows.

The following description discusses the different frequency bands in terms of wavelength bands. One of ordinary skill in the art, well-versed in the operation of $c=f\lambda$, where c is the constant speed of light, f is frequency and $\lambda$ is wavelength, will understand the relationship between frequency f and wavelength $\lambda$.

In general, there are several spectral regions that are indicative of efficient combustion, such as those representative of OH, CH, $O_2$, $CO_2$, $H_2O$ and $CO_2$, which are generally referred to as species indicators since they are indicative of the presence of a particular species. Conversely, there are several spectral regions associated with an inefficient combustion process, such as those resulting from hot particulate matter such as soot and unburned hydrocarbons. The signals resulting from measurements made of these regions, or others of similar nature, are combined and compared to characterize the quality of a combustion flame in a manner which has not been previously achieved.

Figure 3:
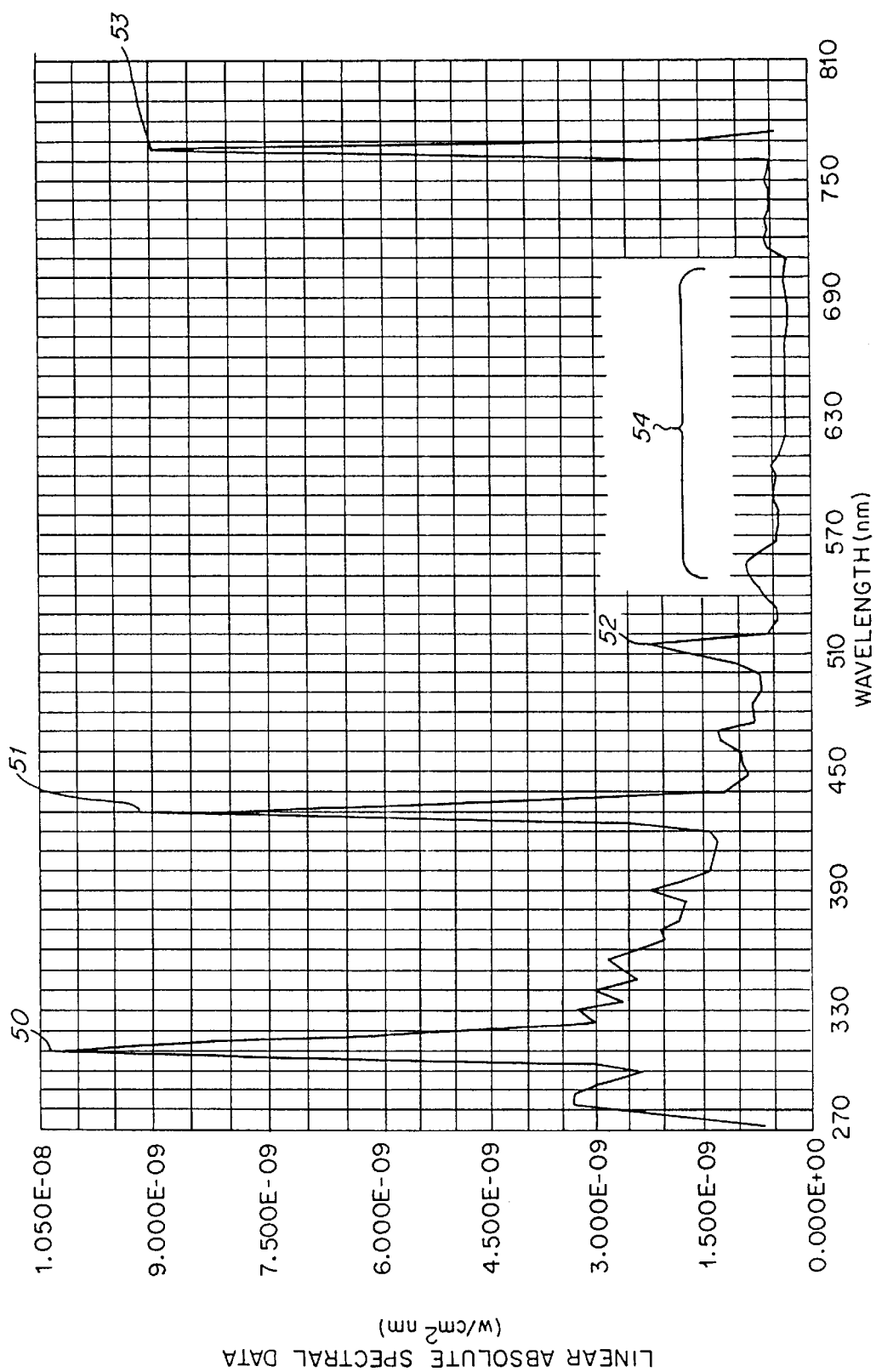
FIG. 3 is a graph showing ultraviolet and visible spectral data of a representative flame.

FIG. 3 depicts spectral data, generally within the ultraviolet (UV) and visible (VIS) energy regions, measured from the flame of a bunsen burner at a distance of approximately four inches, wherein the bunsen burner is operating in a lean burn condition. As can be seen from FIG. 3, there are several peaks of energy, including an OH energy peak 50 at a wavelength of approximately 310 nm (nanometers), a CH energy peak 51 at a wavelength of approximately 431 nm, a $C_2$ energy peak 52 at a wavelength of approximately 517 nm, and an $O_2$ energy peak 53 at a wavelength of approximately 760 nm. A symbiotic relationship between the strength of signals from the energy peaks 50–53 generally is indicative of an efficient combustion process. The amplitudes of these energy peaks 50–53 increase in response to an increase in the quality of the flame under measurement. Additionally FIG. 3 depicts a visible blackbody energy region 54 corresponding approximately to a range of 550 nm to approximately 700 nm, the amplitude of which, in general does not increase significantly in response to an increase in flame quality, or increases proportionally less than the amplitude for the species indicators, i.e., any of OH, CH, $C_2$, $O_2$.

Figure 4:
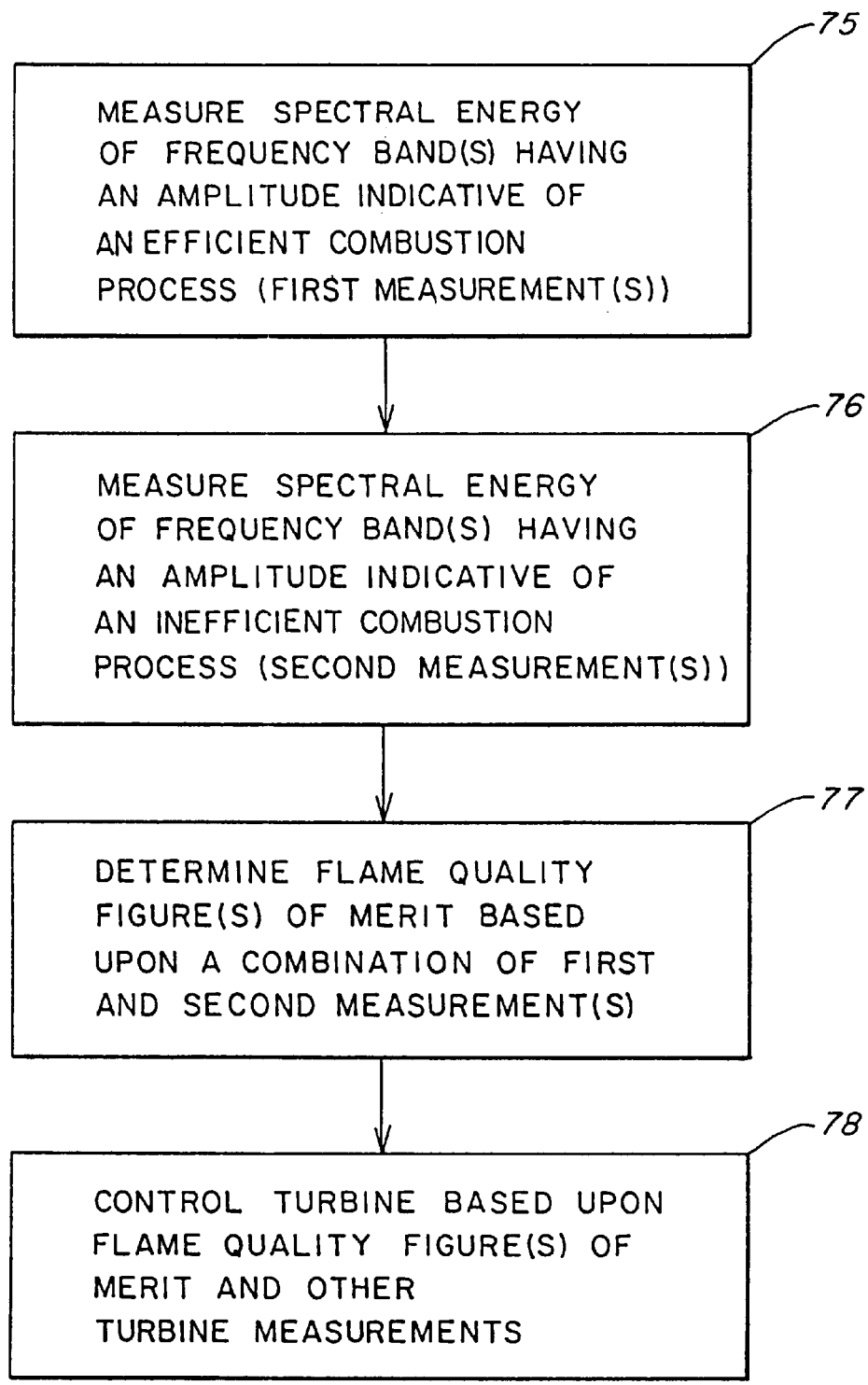
FIG. 4 is a process flow diagram showing steps of an exemplary process performed by the combustion flame characterizer of FIG. 2.

FIG. 4 is a process flow diagram in accordance with at least one embodiment of the invention. In step 75, the spectral energy of at least one frequency band is measured. This frequency band corresponds to an energy element that is indicative of an efficient combustion process. Typically, the related amplitude of this energy element increases with an increase in flame quality, often represented by flame temperature. In step 76, the spectral energy of at least one other frequency band is also measured, wherein the frequency band corresponds to an energy element that is indicative of an inefficient combustion process. Typically, the related amplitude of this energy element decreases or may stay relatively constant with an increase in flame quality, often represented by flame temperature.

In step 77, a flame quality figure of merit is determined based upon a combination of the measurement of step 75 and the measurement of step 76. One example of such a figure of merit is a ratio between the measurement of step 75 and the measurement of step 76. However, several combinations of such measurements may also be combined to determine one or more figures of merit, as will be described in more detail below. For example, two distinct measurements from step 75 could be combined and then compared with a measurement from step 76 to determine a ratio figure of merit. Additionally, for example, two or more different ratios could be combined to form a single figure of merit, or a plurality of figures of merit can be determined.

The timing of the process depicted in FIG. 4 depends generally upon the speed at which the turbine controller operates. An example of the sampling rate of a turbine controller is on the order of 120 mS (milliseconds). Thus, each figure of merit may be updated every 120 mS to support the control process in such an embodiment. Because the control algorithms for different turbine controllers may vary considerably, the figure(s) of merit may also vary considerably. For example, one turbine controller may be designed to be responsive to a percentage of change in flame temperature, which is an example of a figure of merit in accordance with one embodiment of the invention. Other turbine controllers may be designed to be responsive to direct or relative species variation, while others may be designed to be responsive to ratio variations, e.g., the percentage change in a ratio between OH energy and $CO_2$ energy or the percentage change in a ratio between OH energy and visible blackbody energy.

In step 78, the turbine under measurement is controlled based upon the flame quality figures of merit, as well as other measurements such as those described above with respect to FIG. 1. Examples of the other control inputs include input air flow, input fuel flow, various external thermocouple measurements, exhaust gas temperature, and measurements from pressure probes. For example, a pressure transducer may be positioned on the output of the turbine to determine the overall load on the turbine, and this input can be used to determine the control outputs.

The OH band is centered about a wavelength of approximately 310 nm, generally considered to be within the ultraviolet spectrum. The amount of energy within the OH band is generally indicative of an efficient combustion process. In response to an increase in flame temperature, the amplitude of the energy within the OH band increases, and therefore the amplitude of the OH band alone is indicative of flame temperature. In one embodiment, the amplitude of a sensor measurement at the OH band is indicative of whether a flame exists at all.

Figure 5:
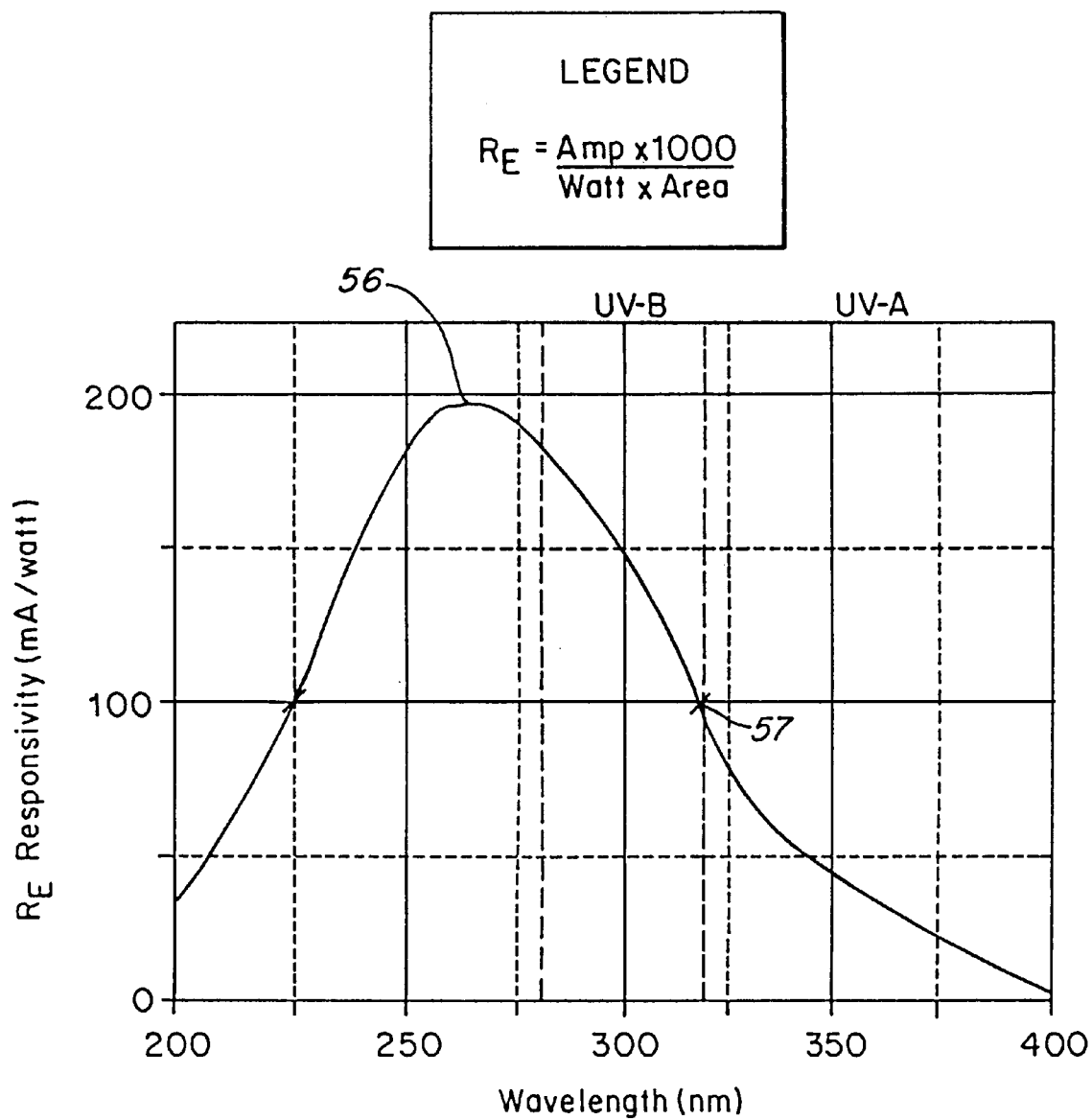
FIG. 5 is a frequency response graph of one of the sensors shown in FIG. 2.

One sensor for measuring the OH band includes a silicon carbide ultraviolet photo detector chip, such as part number CD-260-1.00-D, available from Cree Research, Inc., Durham N.C., USA 27713. The spectral response of such a device is depicted in FIG. 5. In particular, FIG. 5 depicts a peak 56 of responsivity (mA/W) (milliamps per watt) at approximately 270 nm, and a half-peak bandwidth 57 of approximately 95 nm, from a wavelength of approximately 225 nm to a wavelength of approximately 320 nm. This sensor, as well as other sensors described below, can be positioned at the chamber interface 46, or can be positioned remotely, with the sensed energy being transferred from the chamber interface 46 or from internal to the chamber to a remote location.

Additional discussion of Silicon Carbide (SiC) flame sensors, and in particular the relationship between flame temperature and the response of an SiC flame sensor, is provided by Dale Brown et al. in SiC Flame Sensors for Gas Turbine Control Systems," GE Corporate Research and Development, which is incorporated by reference in its entirety.

Figure 6:
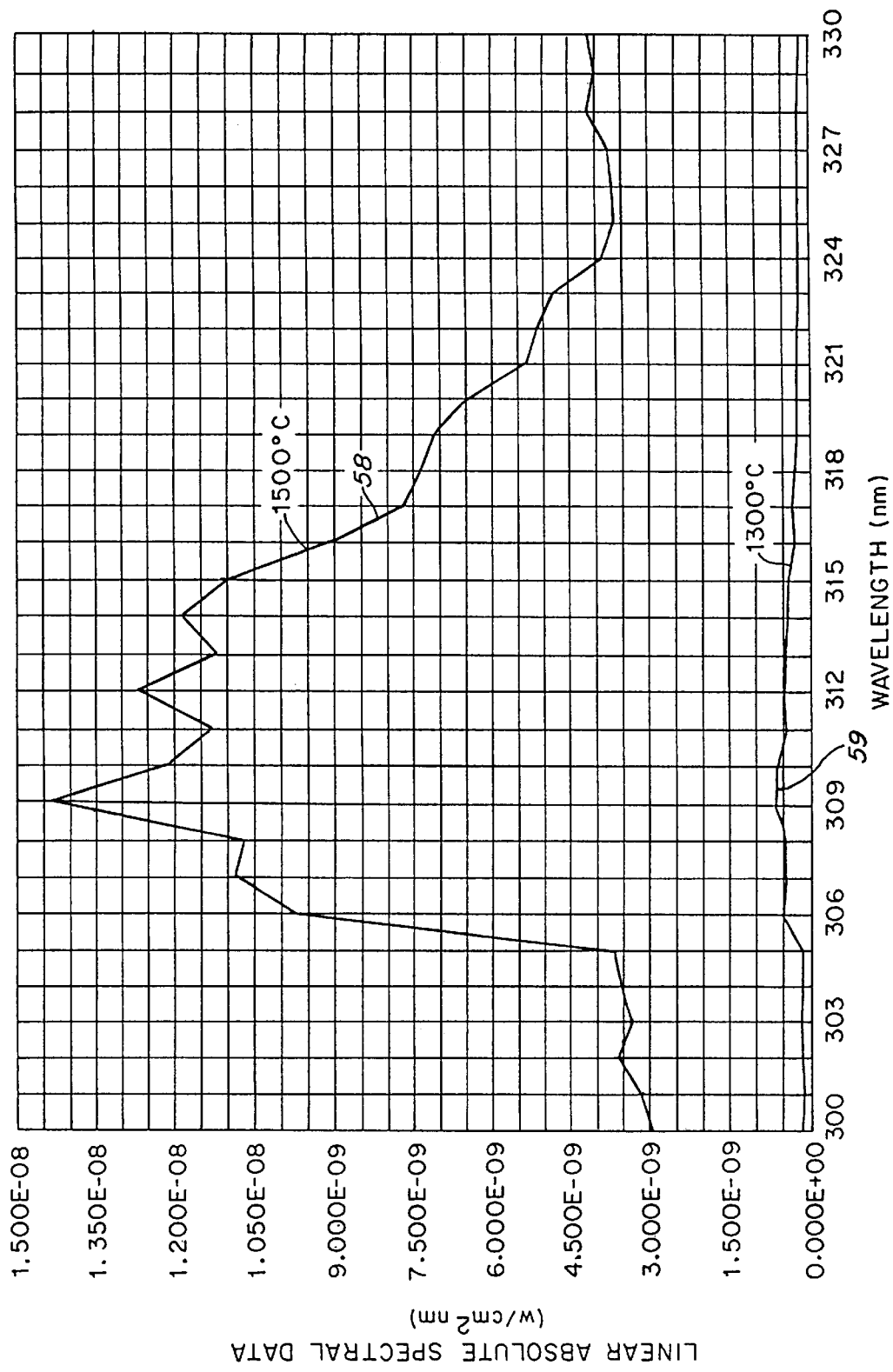
FIG. 6 is a frequency response graph showing a difference in frequency response of a flame at two different temperatures.

The OH band is centered about a wavelength of 310 nm, generally considered to be within the visible spectrum. Generally, the amount of energy within the OH band is indicative of an efficient combustion process. In response to an increase in flame temperature, the amplitude of the OH band increases. As an example of the dependence of the OH band amplitude compared with flame temperature, FIG. 6 depicts spectral data for the 310 nm region from two different flames, a higher temperature flame 58 at approximately 1500° C., and a lower temperature flame 59 at approximately 1300° C. As can be seen from FIG. 6, the peak of the OH band not only varies significantly with respect to flame temperature, but also varies more significantly than other regions directly adjacent to the OH band.

Figure 7:
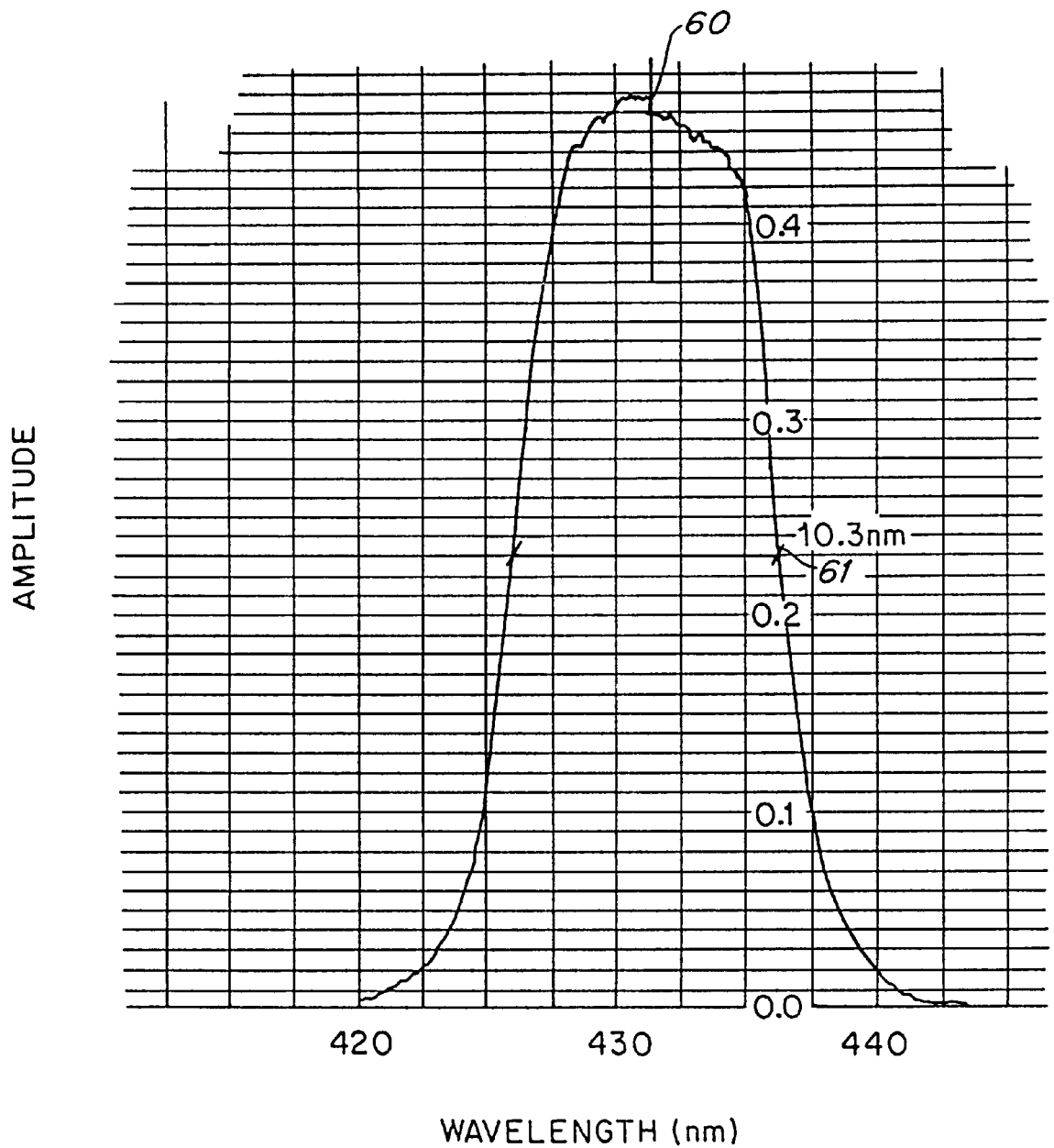
FIG. 7 is a frequency response graph of a filter that is a portion of one of the sensors of FIG. 2.
Figure 8:
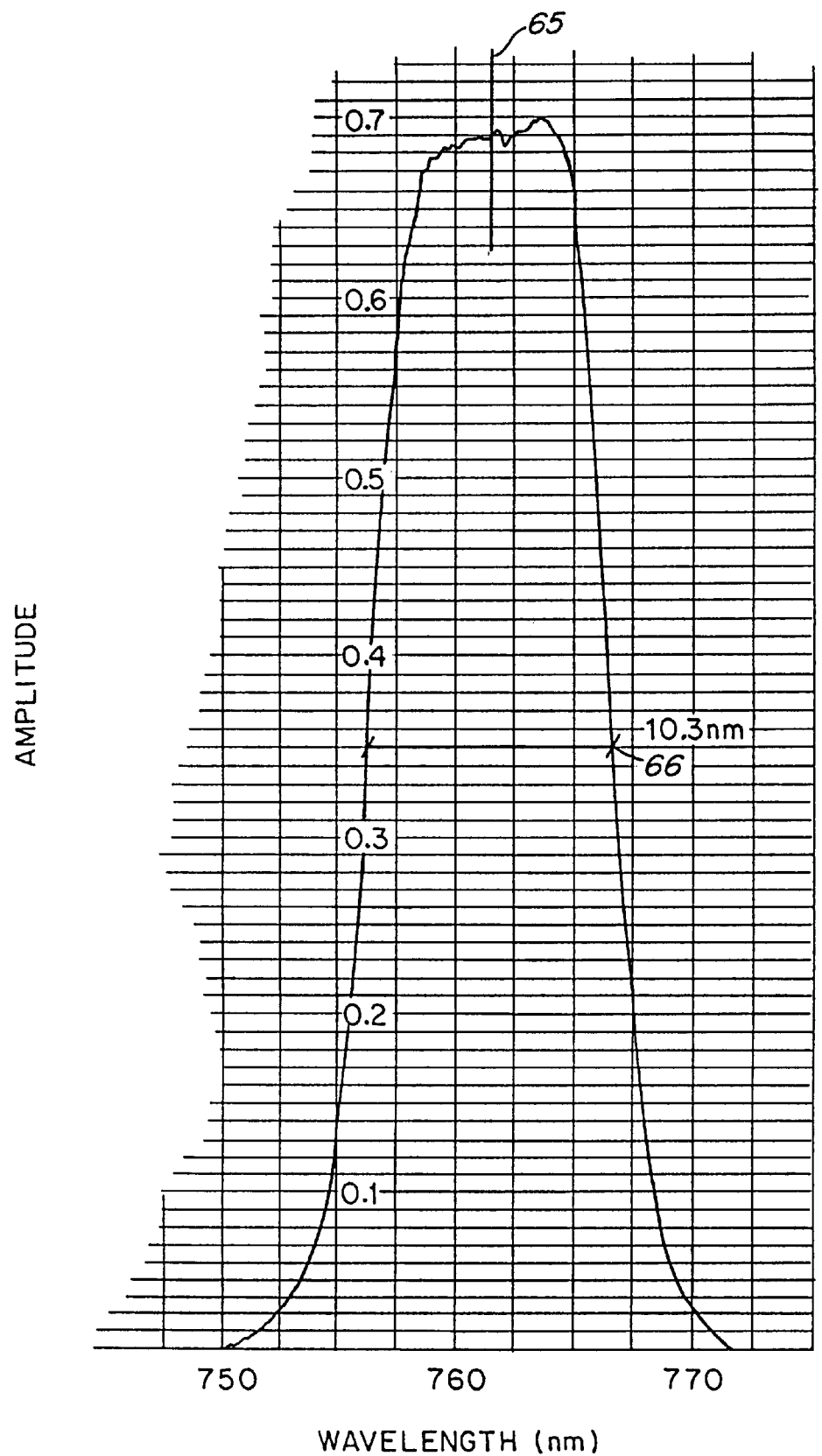
FIG. 8 is a frequency response graph of a filter that is a portion of one of the sensors of FIG. 2.

One sensor for measuring the CH energy band includes an optical filter positioned over a silicon detector. Generally, a silicon detector is responsive to wavelengths between 300 nm and 1100 nm, so a silicon detector in combination with an optical filter will be responsive to a narrower band within the 300 nm–1100 nm band. FIG. 7 is a graph of the spectral response of one such optical filter, P/N 430F510-25, available from Andover Corporation of Salem N.H., USA. As shown in FIG. 7, the spectral response has a peak 60 at a wavelength of approximately 431 nm, and a half-peak bandwidth 61 of approximately 10.3 nm The $O_2$ energy band is centered about a wavelength of 760 nm, also generally considered to be within the visible spectrum. Generally, the amount of energy within the $O_2$ band is indicative of an efficient combustion process. In response to an increase in flame temperature, the amplitude of the $O_2$ band increases. As with the CH band, a sensor for detecting the $O_2$ band may include a silicon detector in combination with an optical filter responsive to a narrower band within the 300 nm–1100 nm band. FIG. 8 is a graph of the spectral response of one such optical filter, P/N 760F510-25, available from Andover Corporation. As shown in FIG. 8, the spectral response has a peak 65 at a wavelength of approximately 762 nm, and a half-peak bandwidth 66 of approximately 10.3 nm.

The visible blackbody energy band has a range from approximately 550 nm to approximately 700 nm, although other ranges may be used with similar results. Such a spectrum generally has an amplitude that is indicative of yellow light, which in turn is indicative of an inefficient soot-producing flame. Thus, the amount of energy within this visible blackbody band is generally representative of an inefficient combustion process, because the visible blackbody band is representative of species such as $C_2$, CN, and NO. The energy within this band has high visibility characteristics.

In response to an increase in flame temperature, the amplitude of the visible blackbody band often increases, but to a lesser degree than the amplitude representative of the species described above.

Accordingly, the amount of energy within each of the OH energy band, the CH energy band, and/or the $O_2$ energy band may be compared with the amount of energy within the visible blackbody energy band to determine a figure of merit relating to flame quality and flame temperature.

Additionally, an amplitude variation of the energy within the visible blackbody energy band may also be indicative of a flame characteristic. For example, if a flame is flickering yellow, such a situation is generally indicative of a state that is different from a state in which the flame is constant yellow. Both the variation in amplitude as well as the variation in frequency of such energy are processed in accordance with an embodiment of the present invention.

Figure 9:
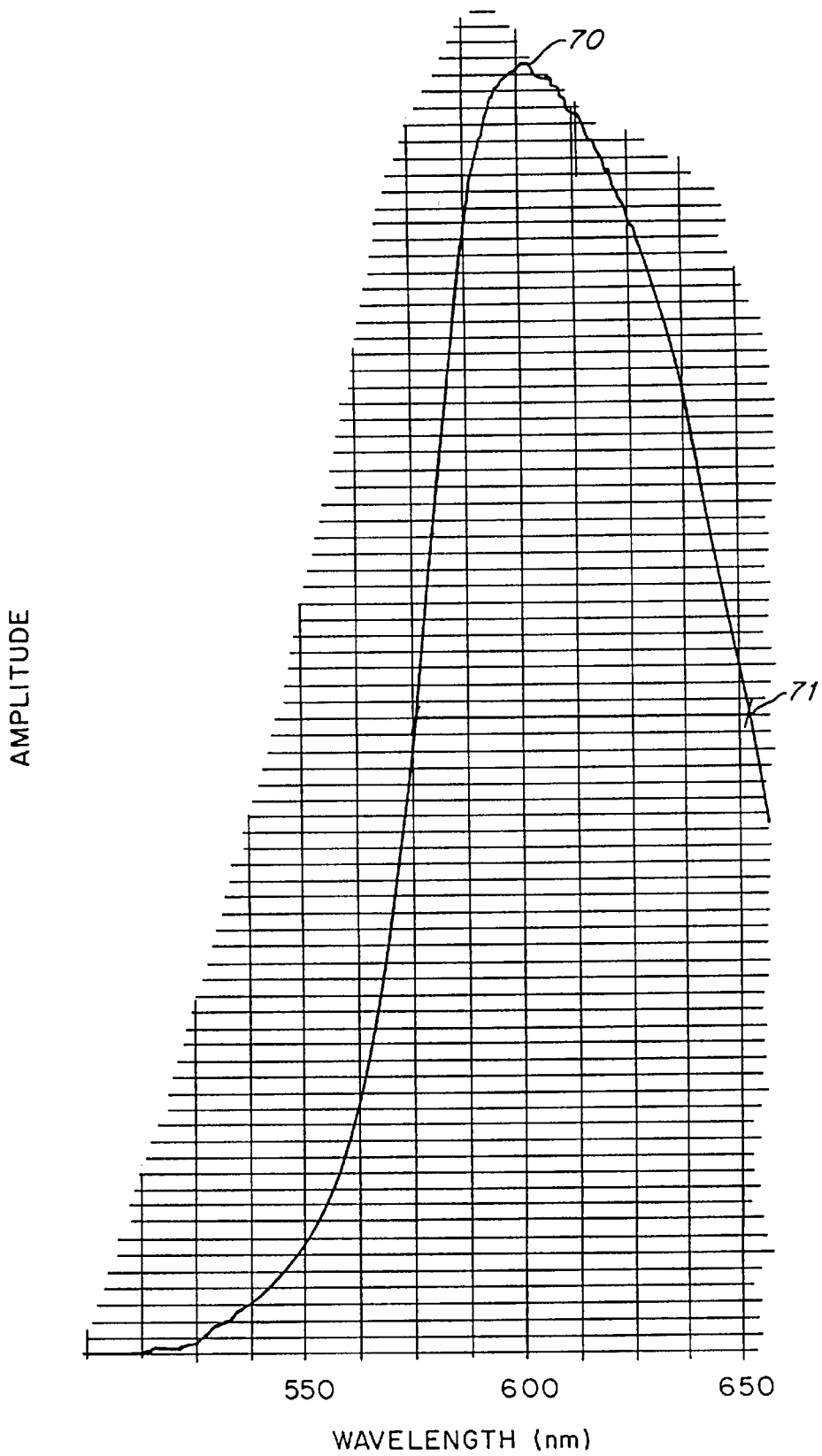
FIG. 9 is a frequency response graph of a filter that is a portion of one of the sensors of FIG. 2.

As with the OH energy band, a sensor for detecting the visible blackbody energy band may include a silicon detector in combination with an optical filter responsive to a narrower band within the 300 nm–1100 nm band. FIG. 9 is a graph of the spectral response of one such optical filter, P/N 600S80-25, available from Andover Corporation. As shown in FIG. 9, the spectral response has a peak 70 at a wavelength of approximately 600 nm, and a half-peak bandwidth 71 of approximately 76 nm.

Figure 10:
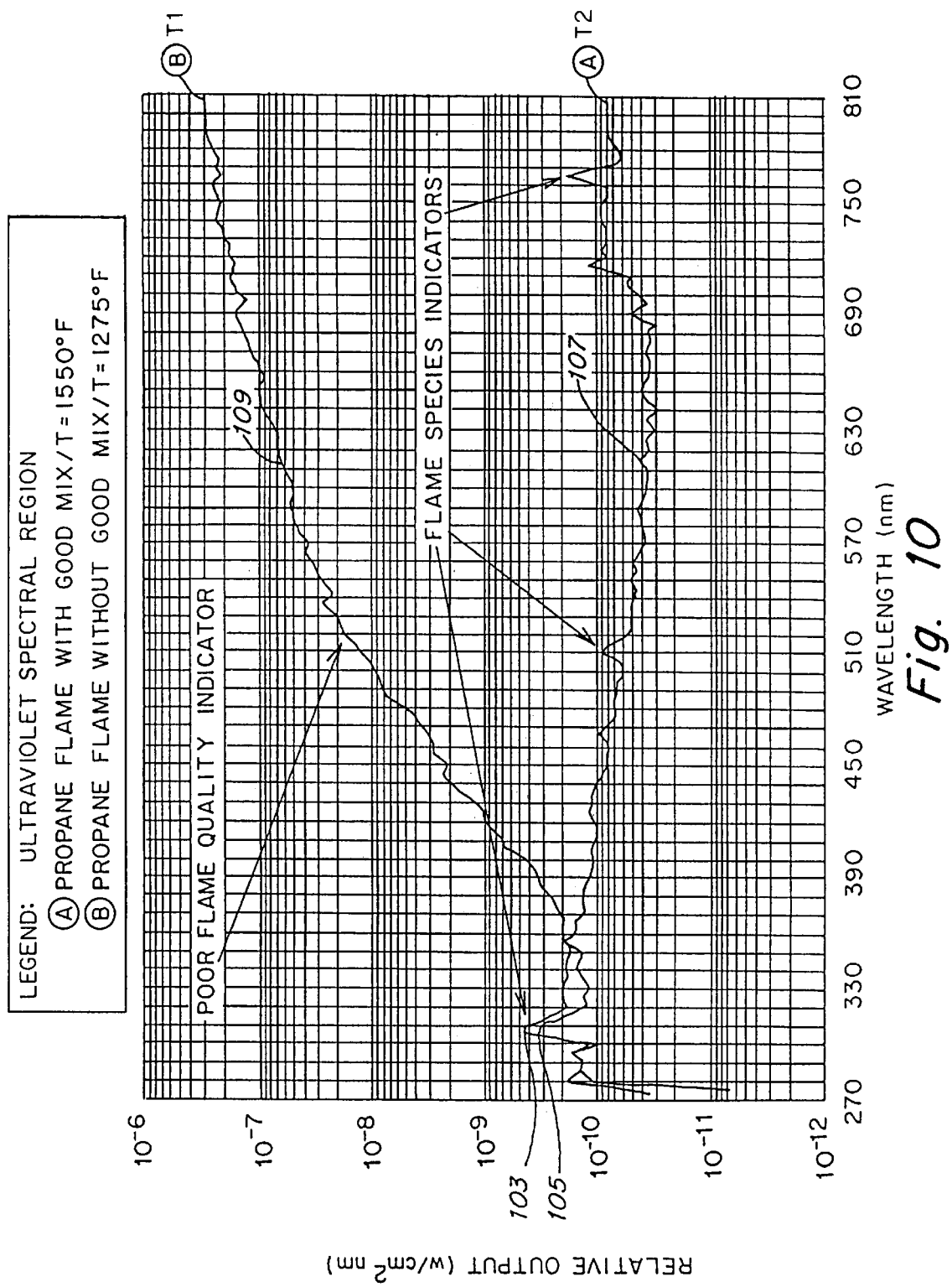
FIG. 10 is a frequency response graph showing the change in frequency response of a blackbody region and a species region in response to a change in flame temperature.

FIG. 10 depicts spectral data for the OH and the visible blackbody energy band, each from two different flames, a lower temperature T1 flame at 1275° F. as indicated by line B., and a cleaner burning higher temperature flame T2 at a temperature of 1550° F., as indicated by line A. The magnitude of the OH signal is indicative of flame temperature. As can be seen in FIG. 10, the ratio between the magnitude of the OH signal peak 103 for the T2 flame and the magnitude of the blackbody center wavelength 107 for the same T2 flame is approximately ten. In contrast, the ratio between the magnitude of the OH signal peak 105 for the T1 flame and the magnitude of the blackbody center wavelength 109 for the same T1 flame is approximately 0.01. Thus, a good example of a figure of merit for characterizing the quality of the combustion flame is the ratio of the OH signal peak magnitude to the visible blackbody signal magnitude, since a change in flame temperature of 1275° F. to 1550° F. results in a change of this figure of merit by a factor of 1000. This can be more easily seen in FIG. 6 where the signal strengths of the OH line vary significantly with flame temperature.

The IR spectral region also provides frequency bands relating to particular species or combination of species, as well as blackbody regions that may be used as references. The information derived from the IR spectral region can be processed in combination with or in addition to the information derived from the UV and VIS bands, in accordance with step 77 of the method shown in FIG. 4, to facilitate efficient control of a turbine.

Several concepts of multi-spectrum detection relating to the IR spectral regions, including a discussion of sensing mechanisms and processing of the sensed measurements for these regions, aspects of which are included in several embodiments of the present invention, are disclosed in U.S. Pat. No. 5,612,676, issued Mar. 18, 1997 to Jonathan C. Plimpton and George L. Minott, entitled "DUAL CHANNEL MULTI-SPECTRUM INFRARED OPTICAL FIRE AND EXPLOSION DETECTION SYSTEM," which is hereby incorporated by reference in its entirety. Other concepts, e.g., processing, and sensing mechanisms relating to both the UV and IR regions, aspects of which are included in several embodiments of the present invention, are also disclosed in U.S. Pat. No. 5,311,167, issued May 10, 1994 to Jonathan C. Plimpton and George L. Minott, entitled "UV/IR FIRE DETECTOR WITH DUAL WAVELENGTH SENSING IR CHANNEL," which is also hereby incorporated by reference in its entirety.

Figure 11:
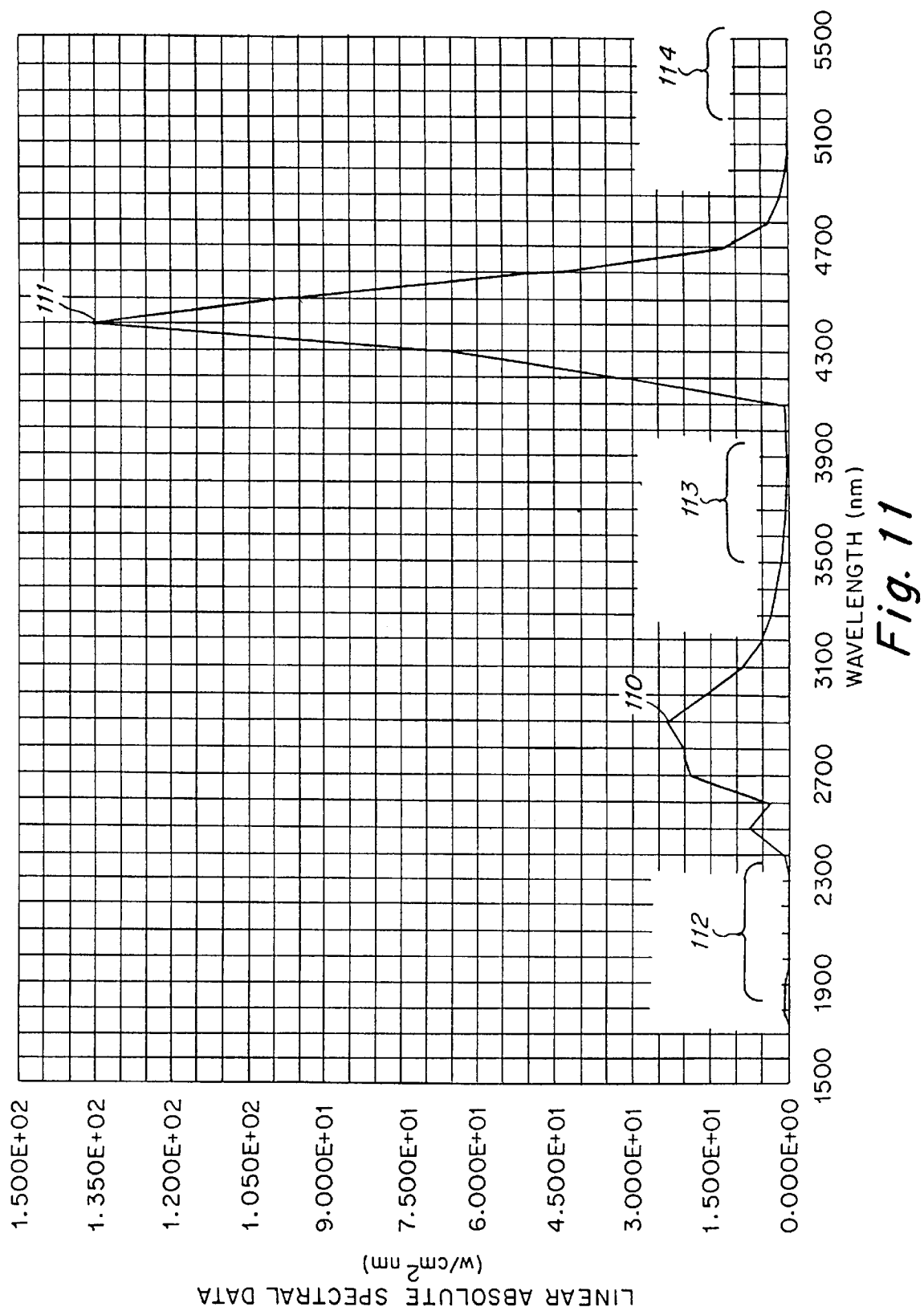
FIG. 11 is a graph showing infrared spectral data of a representative flame.

FIG. 11 depicts spectral data, generally within IR regions, measured from the flame of a bunsen burner at a distance of approximately four inches. As can be seen from FIG. 11, there are several peaks of energy, including a peak 110 at a wavelength of approximately 2.9 um, typically indicative of the presence of $CO_2$ and $H_2O$, and a peak 11 at a wavelength of approximately 4.4 urn typically indicative of the presence of $CO_2$. The energy bands represented by these two peaks are examples of regions that are indicative of an efficient combustion process when sampled and processed in a manner similar to the process described above with respect to the other species indicators.

Additionally, FIG. 11 depicts three blackbody regions, a first blackbody region 112 centered about a wavelength of approximately 2.2 um, a second blackbody region 113 centered about a wavelength of approximately 3.7 um, and a third blackbody region 114 centered about a wavelength of approximately 5.5 um. These blackbody regions 112, 113, 114 are examples of IR regions that are representative of an inefficient combustion process, and therefore may be sampled and processed in a manner similar to the visible blackbody region discussed above.

The IR sensors 39 for detecting the amplitude of energy within the IR regions may be thermopile detectors, available from Meggitt Avionics Inc., 10 Ammon Drive, Manchester N.H., USA 03103. The thermopile detectors may be specified with respect to peak wavelength, bandwidth, and other characteristics to be implemented in accordance with several embodiments of the present invention. Additionally, U.S. Pat. No. 5,612,676 also discloses such sensors.

Figure 12:
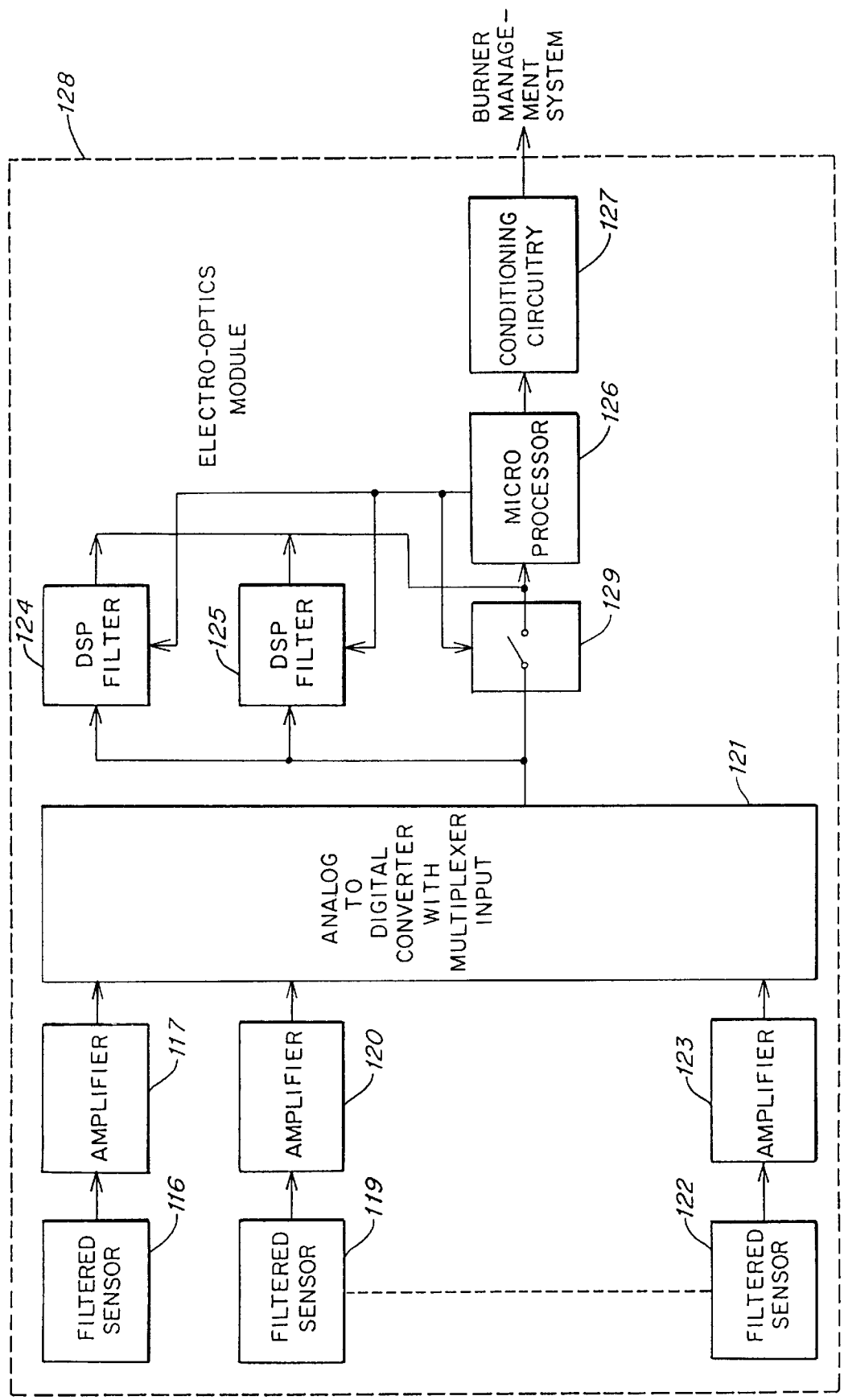
FIG. 12 is a more detailed block diagram of the flame characterizer of FIG. 2.

A more detailed block diagram of an embodiment of the combustion flame characterizer 30 is shown in FIG. 12. This embodiment, referred to as an electro-optics module 128, includes a first filtered sensor 116 coupled to an amplifier 117 which is further coupled to analog-to-digital (A/D) converter (ADC) 121. The electro-optics module 128 also includes a second filtered sensor 119 coupled to an amplifier 120 that is further coupled to the ADC 121, and a third filtered sensor 122 coupled to an amplifier 123 that is further coupled to the ADC 121. As indicated in FIG. 12, the electro-optics module 128 may include many more such sensors and amplifiers configured similarly. The ADC 121 may also include a multiplexer for multiplexing the different analog signals from the amplifiers 117, 120, and 123, or such a multiplexer may be a distinct component. Alternatively, as is known in the art, a plurality of analog-to-digital converters may also be implemented, i.e., an ADC 121 for each amplifier 117, 120, 123.

The ADC 121 is coupled to a microprocessor 126, which in turn is coupled to conditioning circuitry 127. Additionally, both a first Digital Signal Processing (DSP) filter 124 and a second DSP filter 125 are coupled between the ADC 121 and the microprocessor 126.

In operation, each filtered sensor 116, 119, 122 senses a different spectral range within the burner under control. Each amplifier 117, 120, 123 amplifies the signal provided to it by the respective filtered sensor, to provide an analog signal that may be processed by the ADC 121. For example, the amplifier may linearly or non-linearly amplify the sensed signal to provide an analog signal in the most appropriate region in which the ADC 21 operates, as is known in the art.

The ADC 121 provides a digital output representative of the analog signal presented to it by a respective amplifier. In some cases, the digital output is passed directly to the microprocessor 126, for example, as functionally represented by a switch 129, for immediate detection of an amplitude within a particular frequency band. In other cases, the digital output is passed to one of the DSP filters 124, 125, so that the selected DSP can perform filtering prior to passing digital data to the microprocessor 126. An example of DSP filtering includes processing a series of digital signals to extract the AC frequency and amplitude of the series of digital signals. Such filtering may be of particular use when determining the flame flicker based upon the signal representative of the UV or visible blackbody region. As one of ordinary skill in the art will readily understand, whether the microprocessor 126 receives the digital signal directly from the ADC 121 or a processed signal from any of DSP filters 124, 125, or the switch 129 can be controlled by the microprocessor 126 or by multiplexing the digital signals provided to the microprocessor 126.

The conditioning circuitry 127 provides an output to the burner management system, for example, the turbine controller 11. The conditioning circuitry 127 may provide data formatting that is specific to the particular burner management system to which the electro-optics module is coupled.

As discussed above, the electro-optics module 128 may be coupled directly to an optical port of a turbine combustion chamber 45. In one alternative of such an embodiment, the sensors 116, 119, and 122 are located close to the optical port, and the resulting analog signals are transmitted across analog signal wire to a control room that contains the digital processing elements such as ADC 121, DSP filters 124, 125, and microprocessor 126. In another alternative, the entire electro-optics module 128 may be located at the turbine.

Figure 13A:
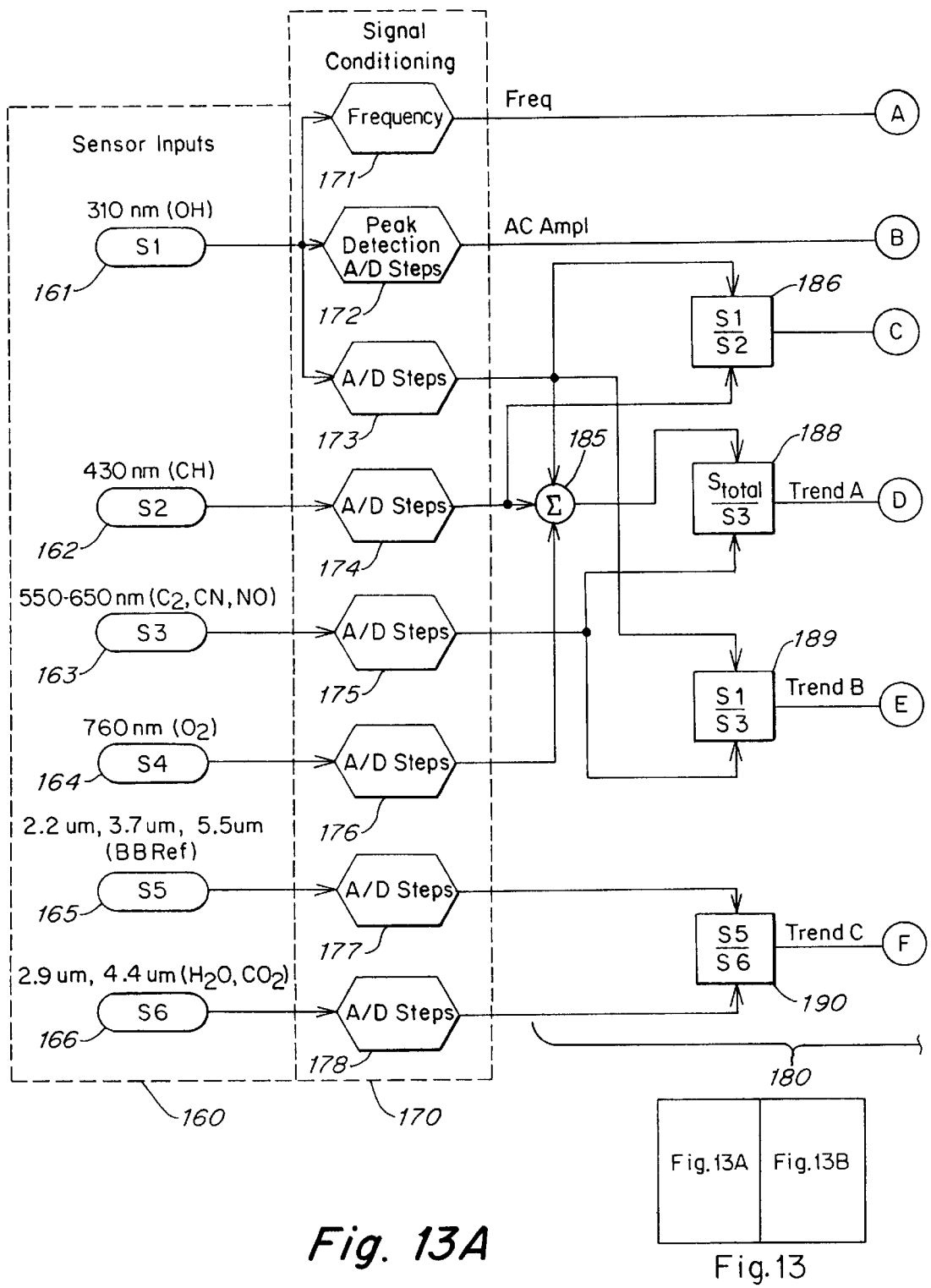
FIG. 13 is a signal flow and analysis diagram showing the process in accordance with an embodiment of the invention.

FIG. 13 is a signal flow and analysis diagram showing the process in accordance with an embodiment of the present invention, for example the embodiment represented by the block diagram of FIG. 12. FIG. 13 also shows the several elements that provide input to or receive output from the process. In particular, FIG. 13 depicts sensor inputs 160 coupled to signal conditioning process 170. Process section 180 performs specific processing on the inputs received from signal conditioning process 170, and provides outputs to a central processing unit 195. Central processing unit 195 also receives inputs from outside monitors 200, and provides an output 196 to a combustion controller.

The sensor inputs shown in FIG. 13 include a measurement S1 161 for OH energy at a wavelength of 310 nm, a measurement S2 162 for CH energy at a wavelength of 430 nm, a measurement S3 163 for the visible blackbody energy region ($C_2$, CN, NO) at a wavelength spectrum from 550 nm–650 nm, a measurement S4 164 for $O_2$ energy at a wavelength of 760 nm, a measurement S5 165 of wavelengths of 2.2 um, 3.7 um, and 5.5 um (representative of an IR blackbody energy region), and a measurement S6 166 for $CO_2$ and $H_2O$, and $CO_2$ energies, at wavelengths of 2.9 um and 4.4 um.

The signal conditioning section 170 includes a frequency determination 171, peak detection 172, and A/D conversion 173, each of which is performed on measurement S1 161. The signal conditioning further includes A/D conversions 174, 175, 176, 177, and 178, respectively performed on measurements S2 through S6 (162–166). In at least one embodiment represented by FIG. 12, the outside monitors 200 include a thermocouple (T/C) input 201, a calculated flame temperature 202, a fuel staged input 203, an air staged input 204, a fuel-to-air ratio input 205, a pressure input 206, a fuel type input 207, and a load input 208.

The T/C input 201 is indicative of thermocouple inputs and measurements of various probes associated with combustion control. The calculated flame temperature 202 is indicative of back calculated combustion flame temperature, typically derived from various thermocouple probes downstream from the combustion chamber. One example of such a calculated flame temperature is the exhaust gas temperature (EGT). The fuel staged input 203 includes measurements associated with various zones of injector ports within the combustion chamber. The air staged input 204 includes measurements associated with the air flow into the combustion chamber. The F/A 205 is a measurement of a fuel to air ratio as determined by the staged fuel and air supply information. The pressure input 206 includes the pressure as measured within the combustion chamber resulting from the combustion process. The fuel type input 207 relates to the type of fuel being used, for example, natural gas, fuel oil, and the like. Finally, the load input 208 indicates the requirements for production of electrical power as needed from the surrounding power grid.

In step 181 of the process 180, the frequency of measurement SI 161 (provided by frequency determination 171) is compared to a threshold, and an output is provided when this frequency exceeds the threshold. Additionally, in step 181, the AC amplitude of the measurement SI, (provided by peak detection and A/D conversion 172), is compared to a second threshold to yield an output when the AC amplitude exceeds the second threshold. The outputs of the steps 181 and 182 may be logically combined in step 184 to yield a determination of the OH level within the flame that is then provided to the central processing unit 195. This figure of merit is representative of flame stability.

In step 186, measurement S1, indicating the flame temperature, is divided by measurement S2, and the output of this step is provided to step 187, which in turn provides an indication of CO and $CO_2$ levels to the central processing unit 195.

In step 185, measurements S1, S2, and S4 are combined to yield a sum (Stotal), which is then provided to step 188, which in turn divides the Stotal value by measurement S3 to determine Trend A, which is provided to the central processing unit 195. This figure of merit, Trend A, is representative of flame quality as represented by the UV and visible signals, or the relative amount of soot and UHC produced during combustion.

In step 189, measurement S1 is divided by measurement S3 to determine Trend B, and in step 190 measurement S5 is divided by measurement S6 to determine Trend C. Trend B is indicative of flame quality, and Trend C is indicative of flame quality as represented by the IR signals.

In step 191, Trend A is compared to Trend C to yield Comparison 1, which is provided to the central processing unit 195 as well as to step 192. In step 192, Comparison 1 is compared to Trend B to yield Comparison 2, also provided to the central processing unit 195. This figure of merit, Comparison 2, is representative of overall flame quality uses multiple frequencies generated by the combustion process to reduce the effects of combustion byproducts on signals in specific frequency regions. For example, water or oil will absorb UV energy and some smaller amount of IR energy, so water will reduce the amplitude of UV signals much more than IR signals. By using multiple frequencies, the effects of water on the quality of the signals are reduced.

Some of the frequencies of interest in the present embodiment, i.e., 2.9 um , 3.7 um, 5.5 um are not as effectively transmitted over fiber optic cable as other frequencies. That is not to say that these frequencies cannot be transmitted over fiber cable, only that fiber cable of more exotic, i.e., expensive materials may be necessary. Micro-Materials Inc., Tampa, Fla. manufactures a sapphire fiber that is useful over the entire wavelength range of interest. The cost associated with a fiber optic cable made from sapphire is prohibitive especially in the lengths necessary for application in most combustor monitoring systems.

Certainly, however, the scanning device could be mounted directly on the combustor to detect the frequencies of interest. This would remove the need for fiber optic cable to transmit the infrared wavelengths being measured.

Figure 20B:
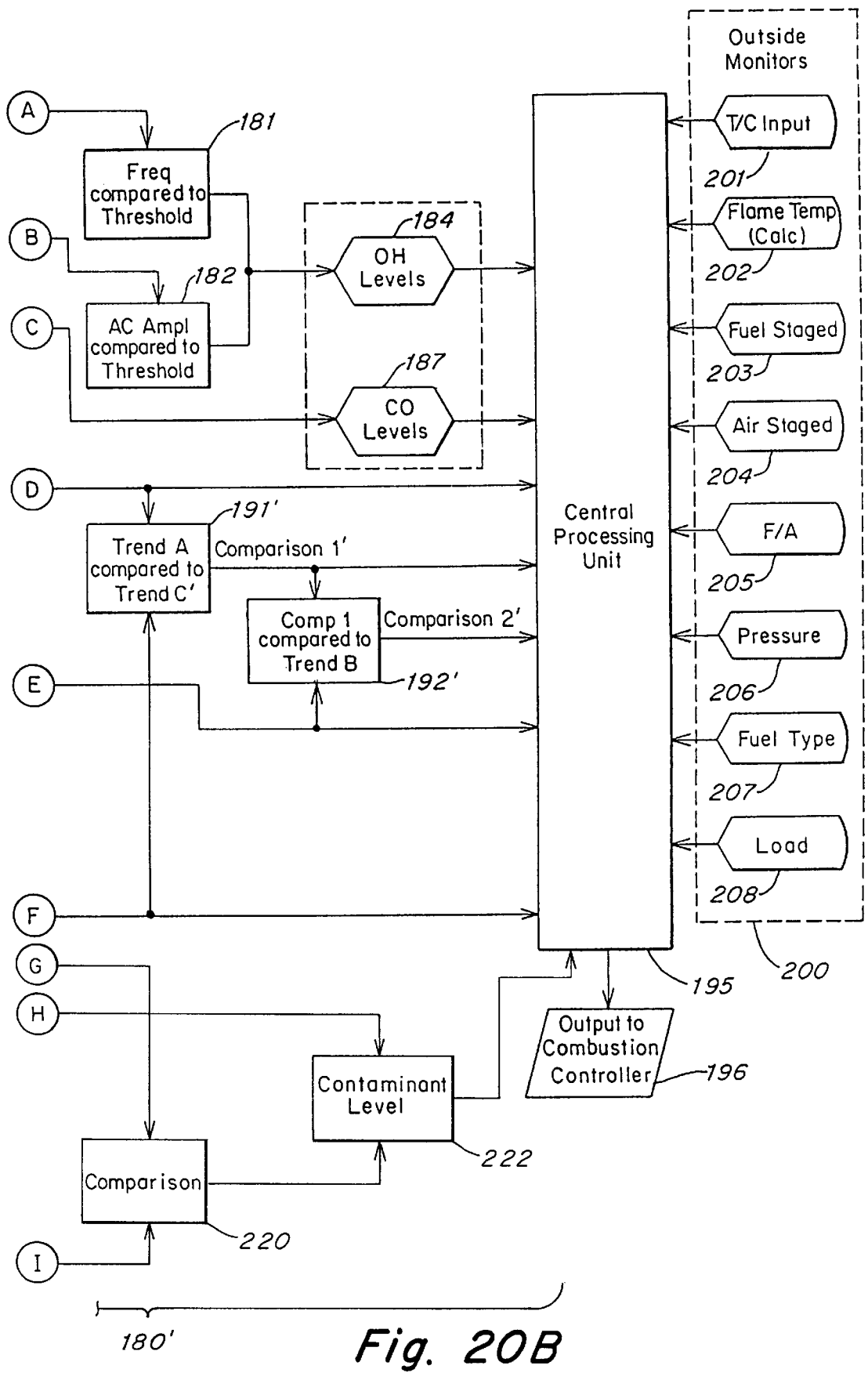
FIG. 20 is a signal flow and analysis diagram showing the process in accordance with an alternate embodiment of the invention.

In an alternate embodiment of the present invention, as shown in FIG. 20, different frequencies of energy can be monitored in order to measure the characteristics of the combustor. Instead of detecting the energies at 2.2 um, 3.7 um and 5.5 um, i.e., measurement S5 as shown in FIG. 13, only the energy at 2.2 um is measured, measurement S5'. This frequency is representative of the blackbody contamination associated with hot soot particles. Additionally, instead of measurement S6 of 2.9 um and 4.4 um energies, a single energy frequency of 1.88 um is used, measurement S6'. This emission band of interest is related to one of the water ($H_2O$) emission bands from a hydrocarbon flame.

Operation of the system show in FIG. 20 follows that already described with reference to FIG. 13. At steps 177', 178' the respective outputs from steps 165', 166' are digitized and sent to step 190' where a ratio of S5' to S6' is determined and output as Trend C'. The output Trend C' is directed to the CPU 195 and to step 191' for comparison with Trend A to generate Comparison 1' provided to the CPU 195. In step 192', Comparison 1' and Trend B are compared to result in Comparison 2' also provided to an input of the CPU 195.

An advantage of using the 1.88 um and 2.2 um measurements is that a hollow waveguide, as will be discussed in more detail below, is not necessary. Fiberguide, Sterling, N.J., manufacturers a low hydroxyl ion content fused silica fiber optic cable suitable for these wavelengths. This material has improved transmission properties in the infrared over that of pure fused silica.

Advantageously, the present invention uses dynamic measurements from an operating burner in order to characterize the combustion flame. These measurements include the amplitude of specific emission wavelengths associated with the flame. Further, operating parameters of the system are also used to control the optimization of the flame. These include, but are not limited to, the above-discussed inputs of thermocouple input, fuel-to-air ratio, pressure, fuel type and load. Thus, the control of the flame is optimized for the particular conditions under which the burner is operating since the control function takes these factors into account.

Further, one of ordinary skill in the art will understand that while the ratios may be expressed in one particular formulation, e.g., Trend B as being S1/S3, the inverse could be calculated, i.e., S3/S1 and the system controlled accordingly.

The detection and monitoring of contaminant levels in the combustor is important to proper operation and maintenance of the combustor. As is known, excessive levels of contaminants lead to equipment degradation and breakdown thus lowering equipment's useful life and thereby increasing operating costs.

Various elements are known to cause corrosion within combustors and thus levels of these elements are monitored and controlled so as to remain under predetermined thresholds. detection of these elements is done by monitoring the strength of spectral emission lines known for each element. Some of these elements and their emission lines wavelengths are shown in FIG. 16. Additional information can be found in the CRC Handbook of Chemistry and Physics, 75th Edition, 1994–1995. As can be seen, Barium has an emission line at 45 nm with a relative strength of 65000 and Vanadium has an emission line at 438 nm with a relative strength of 12000. Thus, for a same amount of Barium and Vanadium, the magnitude of the Barium line is approximately five times greater.

In one embodiment of the present invention, filtered sensors such as those shown in FIG. 12 are tuned to detect spectral emissions from various contaminants present in the combustor fuel. In this mode of operation, one or more detectors are each configured to monitor a very narrow spectral bandwidth associated with a known contaminant. Merely as an illustration, if Lead were being monitored, the wavelength of interest would be centered at 406 nm. The bandwidth of the filter would be set in the range of approximately 5–10 nm. Another detector is configured to accept spectral energy from a wider wavelength spectrum that is also centered about the contaminant emission wavelength. This bandwidth would be at least ±25 nm to ±100 nm, i.e., from 381 nm to 431 nm or 306 nm to 506 nm. A change in the ratio of the two measurements is representative of the presence and relative concentration of the contaminating species or element.

One embodiment of a system that monitors contaminant levels is shown in FIG. 20. In step 210, a contaminant intensity measurement S7 is made and converted into a digital signal at step 214, an output of which is sent to step 218. Concurrently, a reference measurement S8 is made in step 212. This reference measurement S8 is the wider bandwidth around the spectral emission line of interest. In step 216, the measurement S8 is converted from an analog to a digital signal and provided to step 218 where a ratio of S7:S8 is determined and output as Trend D.

At step 220, a comparison of the measurement S8 and measurement S1, i.e., the OH signal, is made. This comparison is done in order to determine whether or not there is a flame present in the combustor. As is known, the presence of a measurement S1 is indicative of a flame burning. The result of the comparison at step 220 is presented to the contaminant level determination step 222.

Prior to a contaminant level being determined, the presence of flame is detected. If no flame is detected, then the contaminant level cannot be accurately determined. If flame is detected, then the contaminant level is detected at step 222 and the output is presented to the CPU 195.

Of course, one of ordinary skill in the art would understand that the functions of the steps in processes 180, 180' could all be accomplished within the CPU 195 by presenting the outputs of the analog to digital conversions 170 to the CPU 195. The functional/step block diagrams of FIGS. 13 and 20 are presented for example only and are not meant to limit the present invention.

The detection of contaminants has been demonstrated at levels as low as one part per million as shown in FIGS. 17A–17D. As can be seen, the background reference signal S8 remains essentially constant while the contaminant channel measurement S7 changes with the amount of contaminants being detected. Thus a ratio of the two will contribute to an indication as to the level of contamination found in the system.

Figure 14:
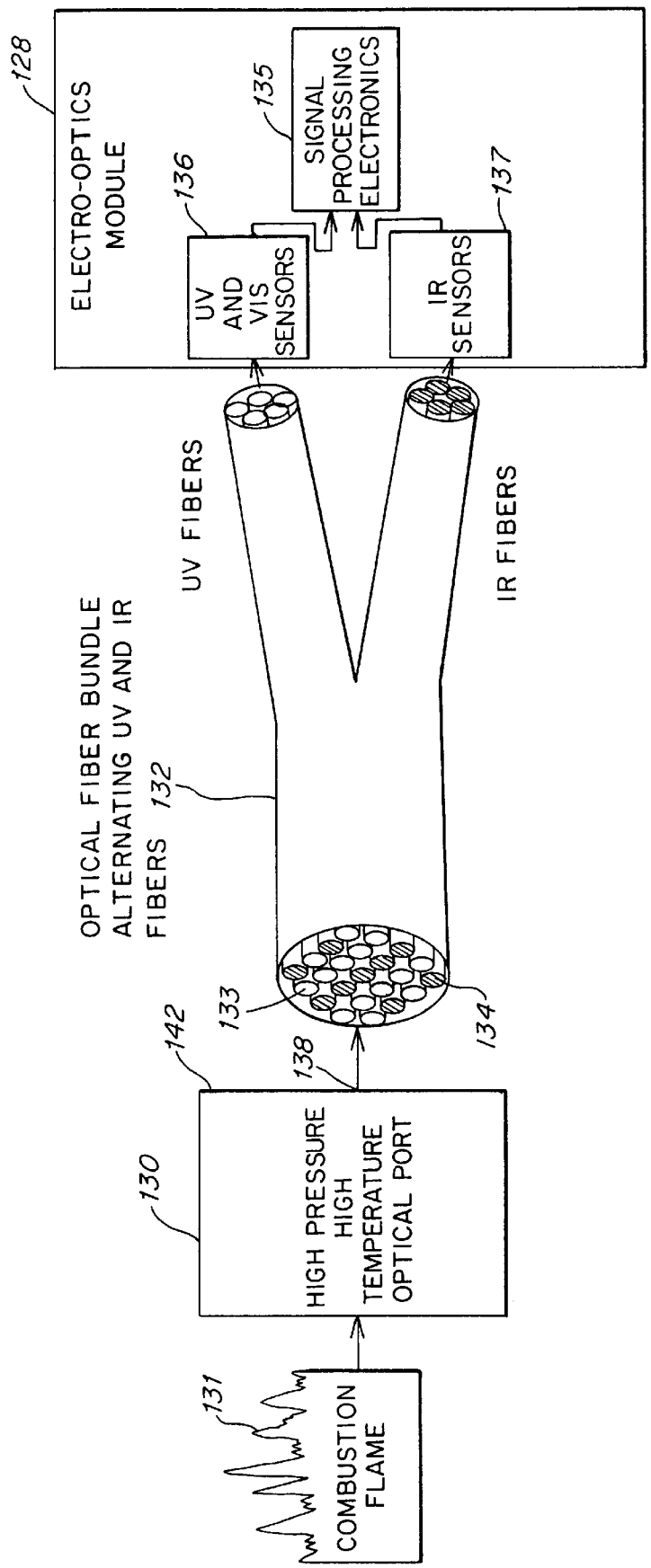
FIG. 14 is a schematic design of an embodiment of the invention in which the flame characterizer is located remotely from the turbine under control.

In another embodiment, depicted in FIG. 14, the electro-optics module 128 is coupled remotely from the optical port. In particular, FIG. 14 depicts a high pressure, high temperature optical port 130 that is disposed to transfer UV, VIS, and IR emissions from the combustion flame 131. The high pressure, high temperature optical port 130 may have an aperture of approximately ¼". An optical fiber bundle 132 is coupled to the electro-optics module 128. For the purpose of explaining details with respect to the optical fiber bundle 132, the sensors within the electro-optics module 128 are categorized as UV and VIS sensors 136, and IR sensors 137. Each of the sensors 136 and 137 may also include the appropriate filter, and is coupled to the signal processing electronics 135. In the embodiment shown in FIG. 12, the signal processing electronics 135 of FIG. 14 includes the A/D converter 121, the DSP filters 124, 125, the microprocessor 126, and the conditioning circuitry 127.

The optical fiber bundle 132 includes UV fibers 133 for passing frequency bands within the UV and VIS regions, and IR fibers 134 for passing frequency bands within the IR region. More detail with respect to aspects of at least one embodiment of the fiber bundle 132, as well as other concepts relating to burner control, are disclosed in U.S. Pat. No. 5,828,797 entitled FIBER OPTIC LINKED FLAME SENSOR, issued Oct. 27, 1998, with named inventors Jonathan C. Plimpton and George L. Minott, which is hereby incorporated by reference in its entirety.

The fiber bundle 132 allows the electro-optics module to be located at a distance from the combustion flame 131. Such a remote location may be advantageous due to the extremely harsh environmental conditions that are often present near the combustion flame 131. In one embodiment, the UV and IR fibers are alternated within the bundle 132, so that the UV and IR spectra may be sensed across the entire optical port 130. The multiple UV fibers and IR fibers within the fiber bundle 132 provide redundancy in the event that there is a failure within any one or more fibers.

Alternatively, the UV and IR fibers can be replaced with the low hydroxyl ion fiber discussed above when implementing the alternate embodiment described relative to the 1.8 um and 2.2 um measurements described in FIG. 20.

As an alternative to the fiber optic cable and electro-optics module 128 of FIG. 14, a simpler less-expensive construction is also possible. The optical fiber 132 discussed above is split prior to connection to the EO module 128. This results in a cumbersome and costly design.

By taking advantage of the protection afforded by the EO enclosure, a more conventional and flexible sheathing over the optical splitter section within the EO module can be used. This also reduces the labor and material costs associated with splitting the signal into multiple legs.

Figure 18:
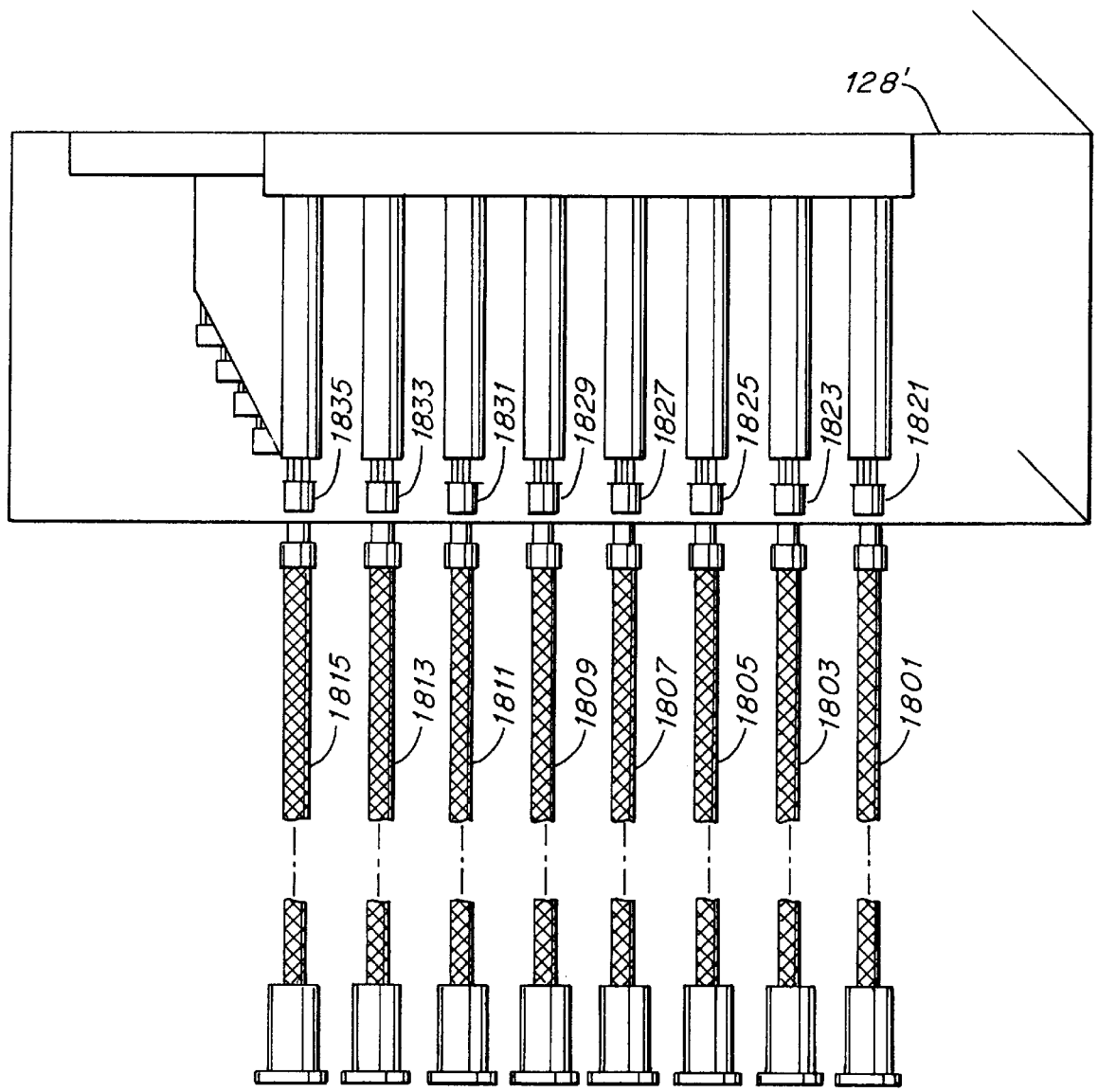
FIG. 18 is an alternate embodiment of the present invention.

As shown in FIG. 18, a single armor-sheathed bundle of fiber optic cables 1801–1815 is coupled to a high pressure flange on a respective combustor (not shown). Each fiber optic cable 1801–1815 remains intact and does not split into multiple legs before reaching the EO module 128. This arrangement simplifies the field installation process, reduces the risk of damage to the fiber optic cable and lowers the overall cost. The combustion spectral emissions from the individual combustors are transmitted via the fiber optic cables to the single EO box 128' consisting of multiple detection modules.

Instead of splitting the optic cable as shown in FIG. 14, the radiant signals from the single fiber are split inside the EO module 128' and directed toward the detectors 1821–1835.

Figure 19:
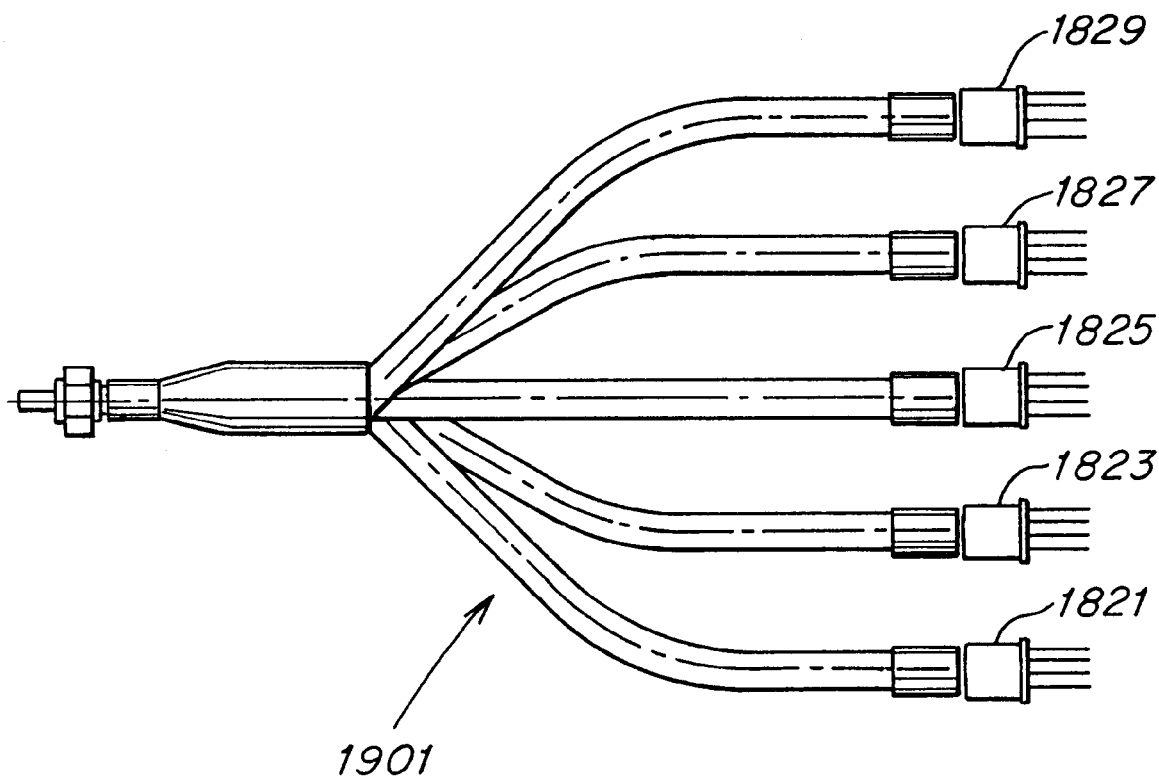
FIG. 19 is an alternate fiber optic cable for use with the alternate embodiment of FIG. 18.

A split fiber optic cable 1901, as shown in FIG. 19, can be used within the EO module 128'. Such a cable allows the detectors 1821–1829 to be coupled directly to the fiber at an end of each leg of the fiber optic splitter. As a result of such a direct coupling, the efficiency of the system is increased by reducing the fiber-to-detector losses at multiple optical surfaces.

Figure 15:
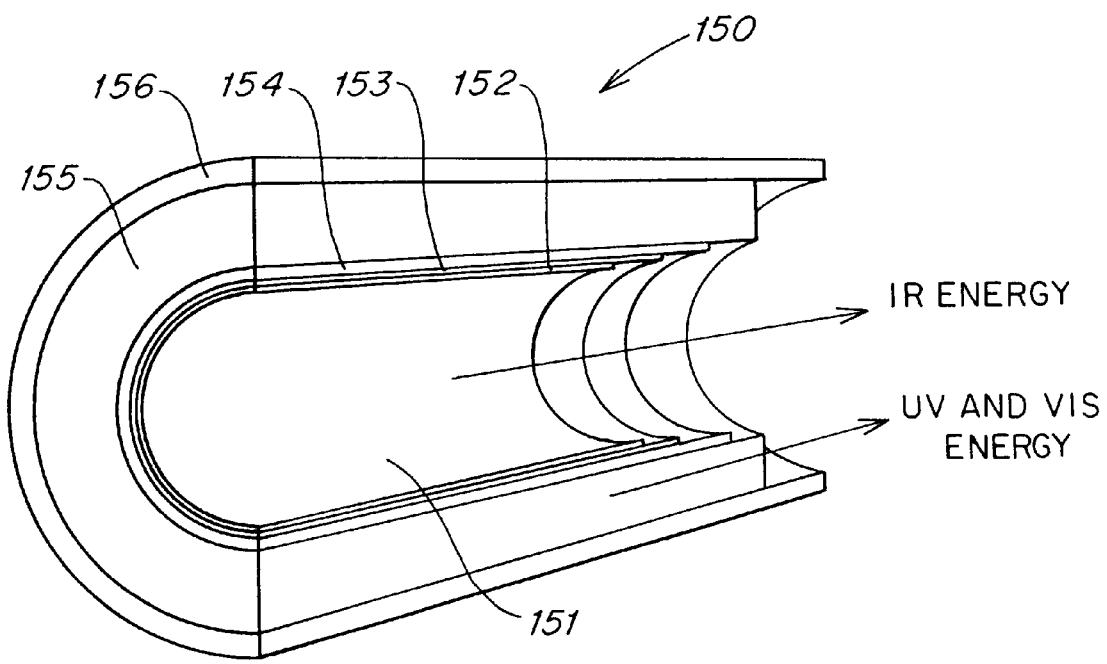
FIG. 15 is a cross section of a hollow fiber structure in accordance with an embodiment of the invention.
Figure 17A:
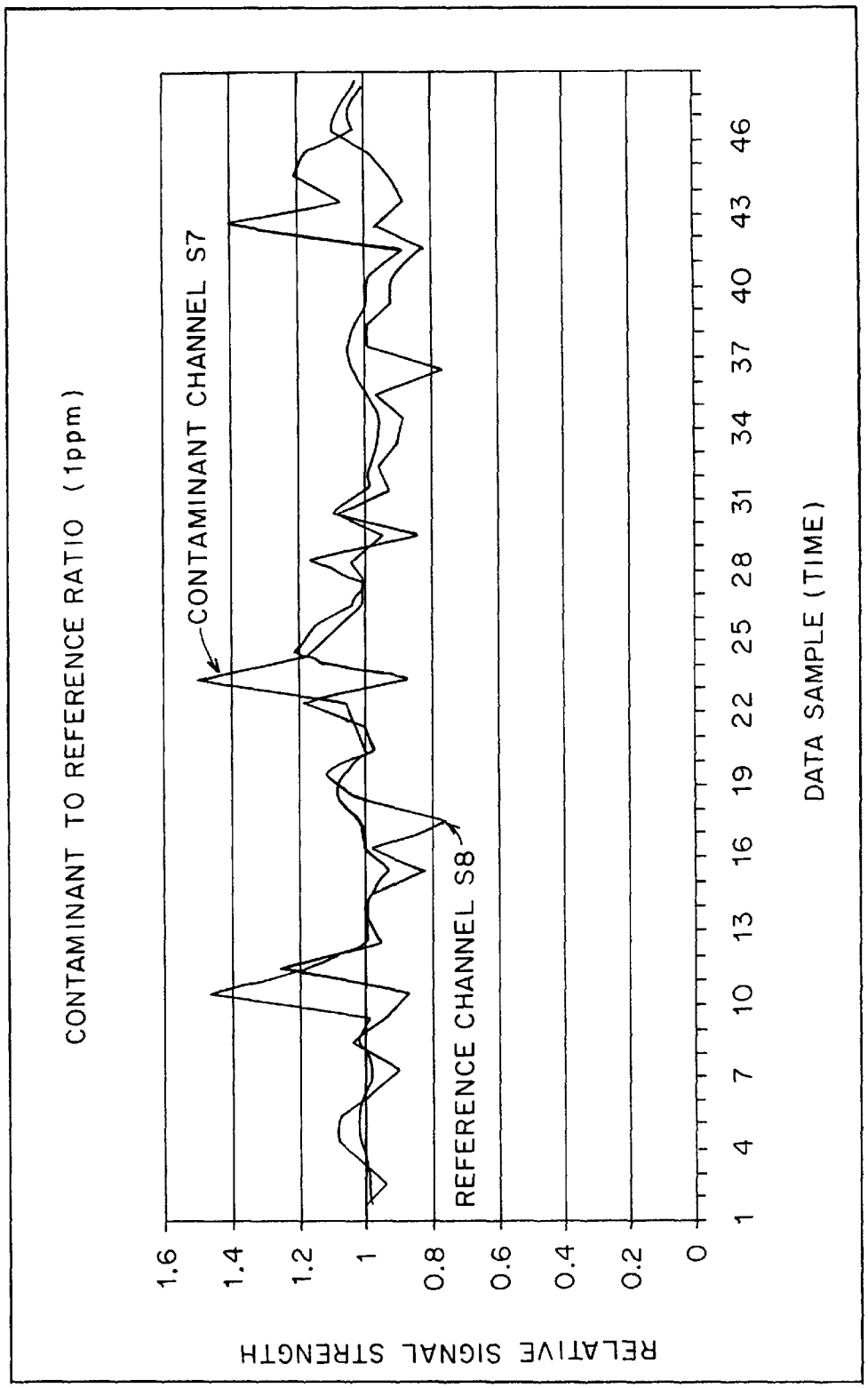
FIG. 17A–17D shows the relative strengths of contaminant intensities for different levels of contamination.
Figure 17B:
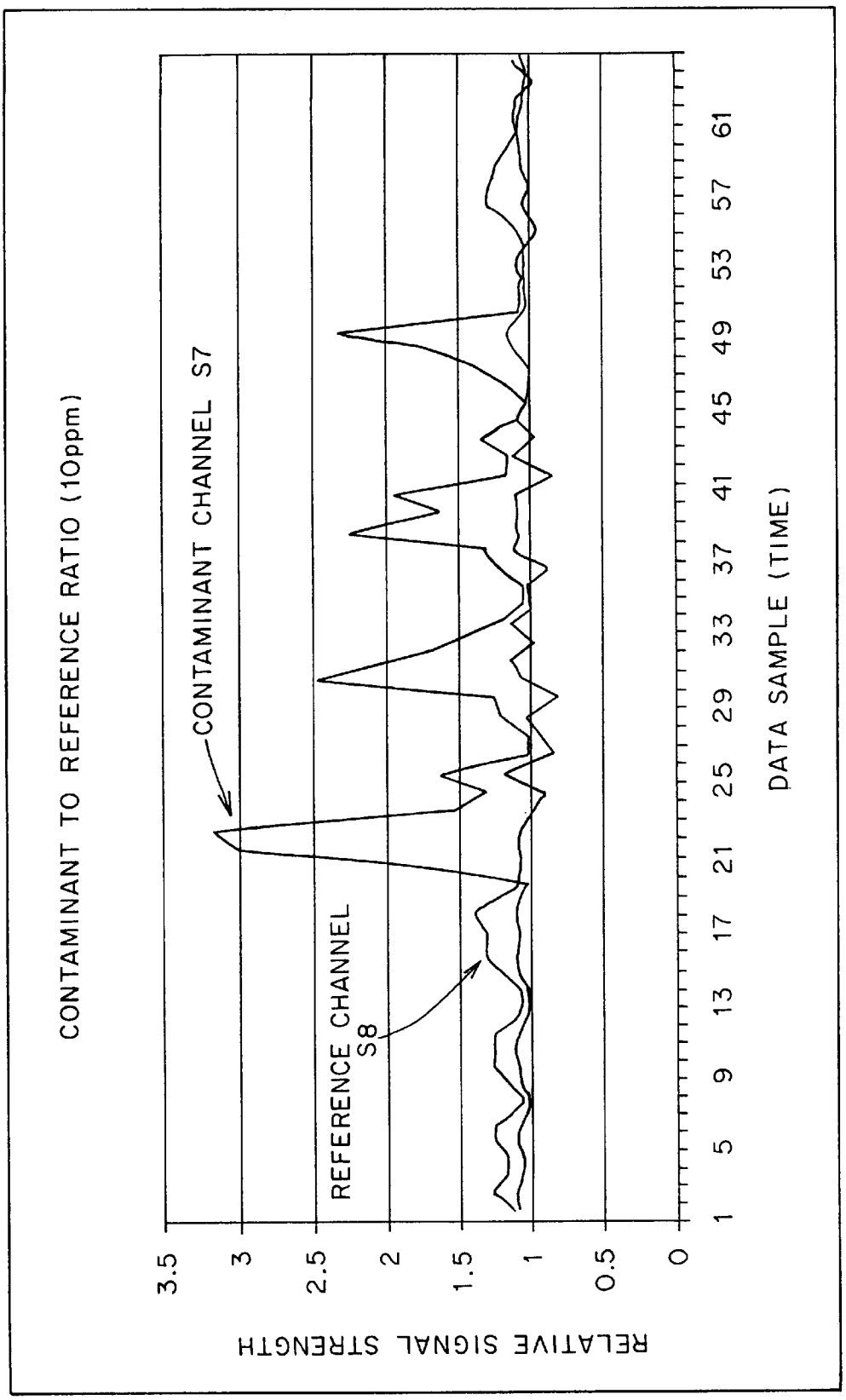
Figure 17C:
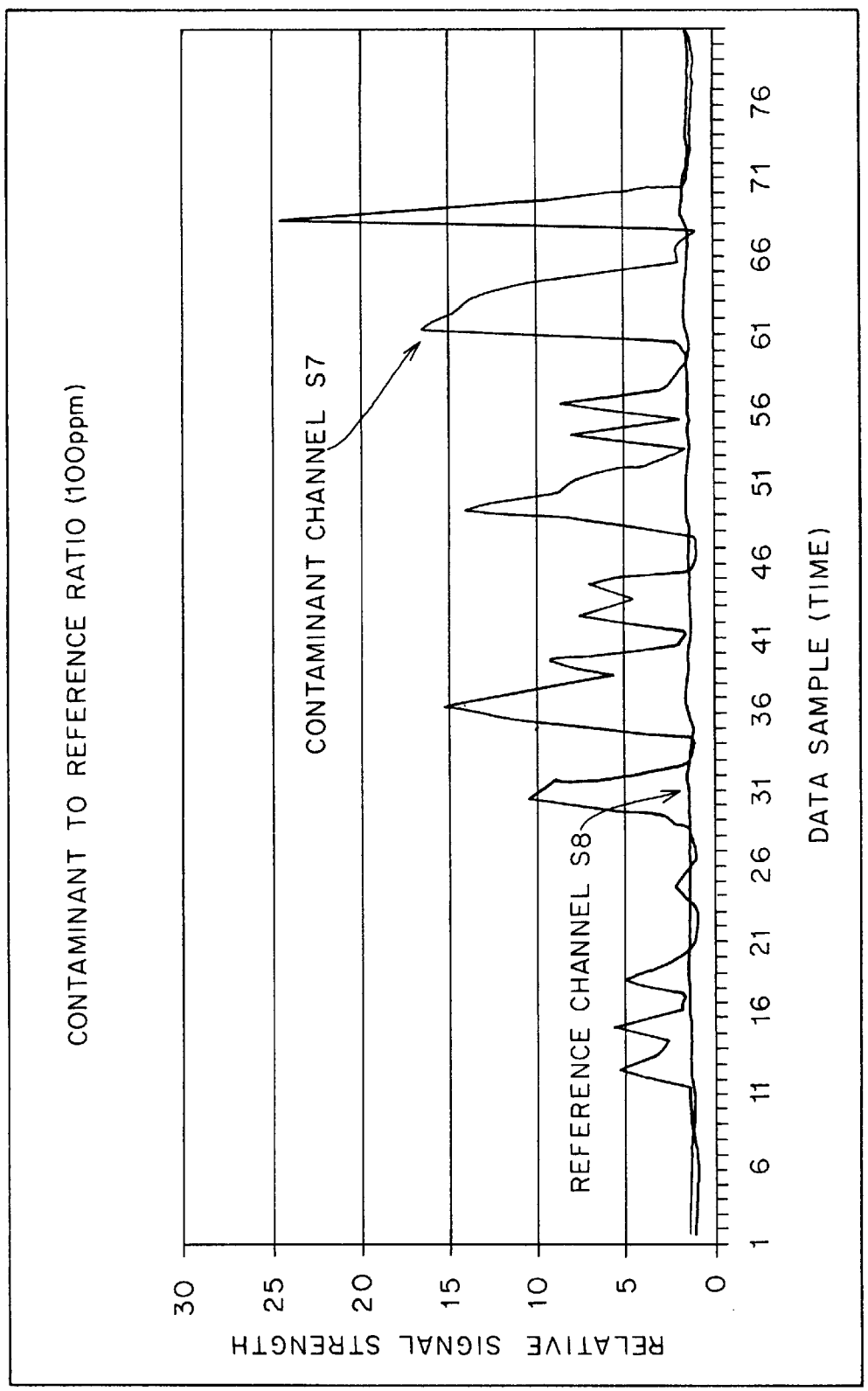
Figure 17D:
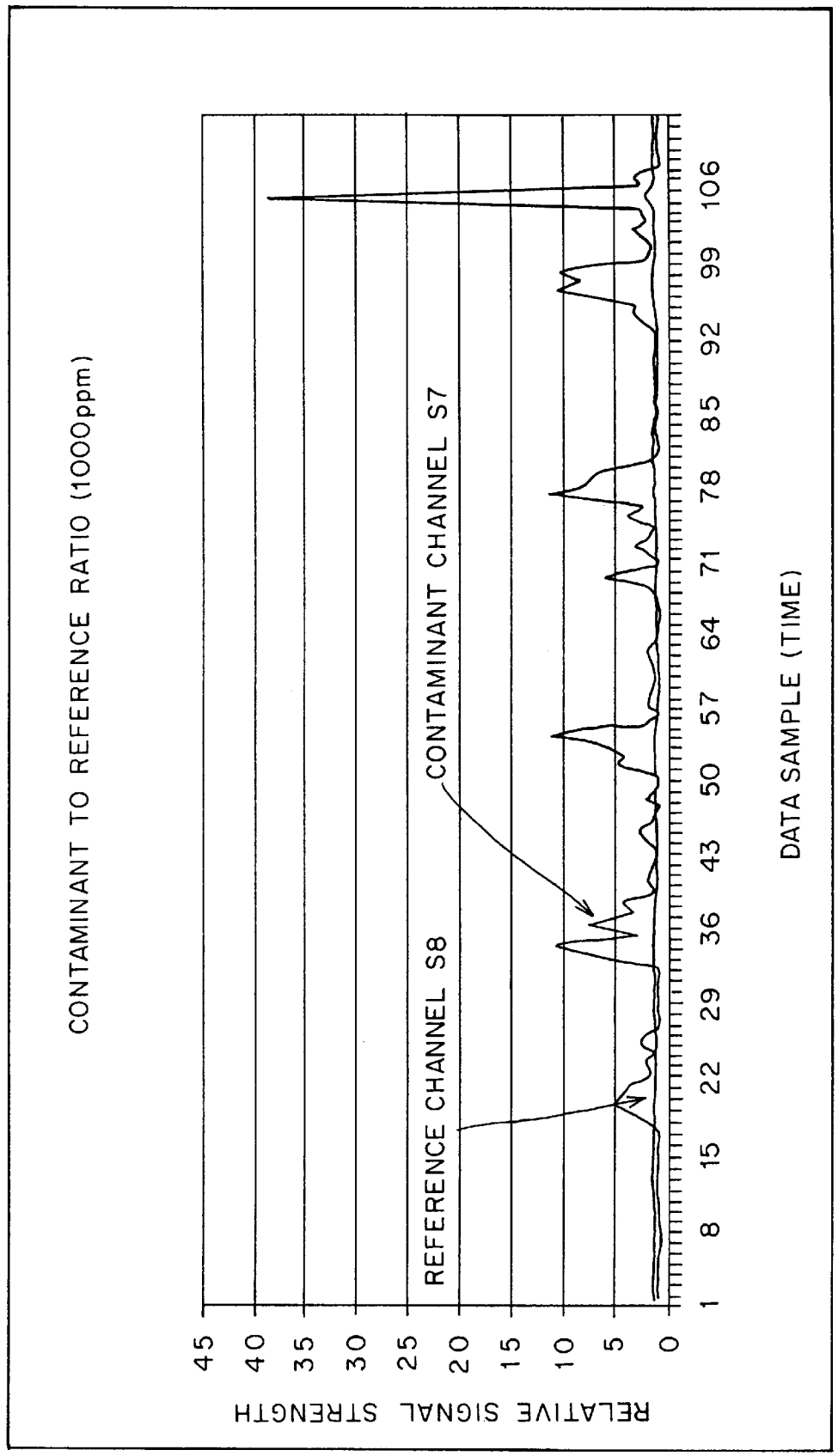

FIG. 15 depicts a single fiber that provides a transmission path for energy within the UV, VIS, and IR spectra. This fiber may be bundled into a single arrangement similar to that shown in FIG. 14.

FIG. 15 discloses a cross section of a hollow fiber 150 which may be used in place of each of the UV fiber types 133 and the IR fiber types 134. The hollow fiber 150 includes a metal dielectric layer 152 positioned about a hollow core 151. A metallic layer 153 surrounds the metal dielectric layer 152, which in turn is surrounded by a first structure of doped silica cladding 154. A fused silica core 155 surrounds the first structure of doped silica cladding 154, which in turn is surrounded by a second structure of doped silica cladding 156.

A more detailed discussion of hollow fiber optics is provided by James A. Harrington in "Crystalline and Hollow Infrared Fiber Optics," (Fiber Optic Materials Research Program, Rutgers University, 1990), which is hereby incorporated by reference in its entirety.

In operation, energy within both the UV and VIS spectra pass through the fused silica core 155. The two structures of doped silica cladding 154, 156 allow internal reflection of the UV and VIS energy so that the energy passes efficiently. In particular, the two structures of doped silica cladding 154, 156 have a higher index of refraction than the silica core 155, so that UV and VIS energy that approaches the edge of the silica core is reflected back into the silica core instead of passing through the edge.

However, fused silica does not pass IR energy as efficiently as a hollow core. Thus, in the embodiment shown in FIG. 15, the hollow core 151 is provided and surrounded by a metal dielectric layer 152, so that the IR energy will reflect off of the metal dielectric layer 152 and pass down the hollow core 151.

Thus, the metal dielectric layer (or wall) 152 has an internal face that defines the hollow core 151 of the fiber structure 150, so that the hollow core 151 passes infrared energy along the fiber structure 150. Additionally, a core of UV and visible-transmissive material 155 surrounds the metal dielectric layer 152, so that the metal dielectric layer 152 passes IR and visible energy along the fiber structure. A bundle of such fibers 150 may be used to replace the entire fiber bundle 132, or may be used in combination with such a bundle 132.

In yet another embodiment of the present invention, discussed briefly above, a fiber is disposed within a combustion chamber through the fuel path that leads to a particular fuel injector. Typically, such an arrangement would mean that the particular fuel injector would not be operational. However, in one example of such an embodiment, a turbine includes on the order of twenty fuel injectors, so that the loss of only one fuel injector is minimal to the overall fuel control algorithm. This loss in fuel control may in some cases be compensated by the gain in accuracy of flame characterization which is attainable from within the combustion chamber.

In one embodiment, a metallic sheathed optical fiber is fed down a fuel injector tube and a first end of the fiber is tack-welded to the fuel injector itself. The other end of the metallic sheathed optical fiber may be coupled directly to an electro-optics module 128. Alternatively, the other end of the metallic sheathed optical fiber may be coupled to an optical fiber bundle such as optical fiber bundle 132, or may be coupled to a fiber bundle such as one constructed of multiple hollow fiber structures 150, either of which may be coupled to the electro-optics module 128. The metallic sheathed optical fiber may include a sapphire structure suitable for passing IR energy, and may also be gold-clad to improve durability in the presence of the extreme combustion chamber temperature. One example of such metallic sheathing is an INCONEL "610" tube, available from Uniform Tubes of Collegeville, Pa.

When the sensing end of a fiber is disposed within the combustion chamber, such an arrangement increases the proximity to the combustion flame, may provide a better viewing angle into the combustion flame, and may result in a decrease in optical losses that otherwise may occur across the combustion chamber and through the optical port 130.

Having thus described several embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. An apparatus for detecting an amount of a contaminant in an enclosure, the apparatus comprising:
   a first detector to detect a first amplitude of energy within a first wavelength band of a first width centered about an emission wavelength of the contaminant;
   a second detector to detect a second amplitude of energy within a second wavelength band of a second width, larger than the first width, the second wavelength band also centered about the emission wavelength of the contaminant;
   a calculator to calculate a ratio of the first detected amplitude of energy to the second detected amplitude of energy; and
   a comparator to compare the calculated ratio to a known threshold to determine the amount of contaminant in the enclosure.

2. The apparatus as recited in claim 1, wherein the first width is in the range of 5-10 nm and the emission wavelength is one of 438 nm, 588.9 nm and 589.5 nm.

3. The apparatus as recited in claim 1, further comprising:
   a third detector to detect a presence of a flame in the enclosure,
   wherein the calculator indicates the calculated ratio as being invalid when the third detector does not detect the presence of a flame.

4. A method of detecting an amount of a contaminant in an enclosure, the method comprising:
   detecting a first amplitude of energy within a first wavelength band of a first width centered about an emission wavelength of the contaminant;
   detecting a second amplitude of energy within a second wavelength band of a second width, larger than the first width, the second wavelength band also centered about the emission wavelength of the contaminant;
   determining a ratio of the first amplitude of energy to the second amplitude of energy; and
   comparing the ratio to a known threshold to determine the amount of contaminant in the enclosure.

5. The method as recited in claim 4, wherein the first width is in the range of 510 nm and the emission wavelength is one of 438 nm, 588.9 nm and 589.5 nm.

6. The method as recited in claim 4, further comprising:
   detecting a presence of a flame in the enclosure, wherein, when no flame is detected, the determined ratio is indicated as being invalid.

7. The method as recited in claim 6, wherein the step of detecting the presence of a flame comprises:

detecting a third amplitude of energy within a third wavelength band of a third width centered about an emission wavelength of a species found when a flame is present.

8. The method as recited in claim 7, wherein the species is OH and the species emission wavelength is 310 nm.

9. A system for characterizing a combustion flame, comprising:

a first sensor having an input that receives energy within a first wavelength band of the flame, and an output that provides a first signal indicative of an amplitude of the energy within the first wavelength band;

a second sensor having an input that receives energy within a second wavelength band of the flame, different from the first wavelength band, and an output that provides a second signal indicative of an amplitude of the energy within the second wavelength band; and a flame characterization module having a first input coupled to the output of the first sensor, a second input coupled to the output of the second sensor, and an output that provides a figure of merit that characterizes the combustion flame as a function of at least a ratio of the first signal to the second signal, wherein the first wavelength band includes a wavelength of 2200 nm, representative of an inefficient combustion process; and wherein the second wavelength band is representative of an efficient combustion process.

10. The system as recited in claim 9, wherein:

the second wavelength band includes a wavelength of 1880 nm.

11. The system as recited in claim 10, further comprising:

a third sensor having an input that receives energy within a third wavelength band of the flame, and an output that provides a third signal indicative of an amplitude of the energy within the third wavelength band;

a fourth sensor having an input that receives energy within a fourth wavelength band of the flame, different from the first wavelength band, and an output that provides a fourth signal indicative of an amplitude of the energy within the fourth wavelength band, wherein the third wavelength band is chosen to be a predetermined band characterizing an efficient combustion process;

wherein the fourth wavelength band is chosen to be a predetermined band characterizing an efficient combustion process, and wherein the figure of merit further characterizes the combustion flame as a function of the third and fourth signals.

12. The system of claim 3, further comprising:

a fifth sensor having an input that receives energy within a fifth wavelength band of the flame within a visible region, and an output that provides a fifth signal indicative of an amplitude of the energy within the fifth wavelength band; and a sixth sensor having an input that receives energy within a sixth wavelength band of the flame within a visible region, and an output that provides a sixth signal indicative of an amplitude of the energy within the sixth wavelength band;

wherein the fifth and sixth wavelength bands are chosen to be predetermined to bands characteristic of an efficient combustion process;

wherein the third wavelength band is within an ultraviolet region; and wherein the flame characterization module receives the fifth signal and the sixth signal, and the figure of merit further characterizes the combustion flame as a function of the fifth and sixth signals.

13. The system of claim 12, further comprising a wavelength variation module having an input that receives the third signal, and an output that provides a measure of a change in flicker frequency of an amplitude variation, in the frequency domain, of the third signal, wherein the flame characterization module receives the measure of change in flicker frequency, and the figure of merit further characterizes the combustion flame as a function of the measure of change in flicker frequency.

14. The system of claim 12, further comprising an AC amplitude measurement module having an input that receives the third signal, and an output that provides a measure of an amount of AC amplitude variation of the third signal, wherein the flame characterization module receives the measure of the amount of AC amplitude variation, and the figure of merit further characterizes the combustion flame as a function of the measure of the amount of AC amplitude variation.

15. The system as recited in claim 1, further comprising:

a third sensor having an input that receives energy within a third wavelength band of the flame, and an output that provides a third signal indicative of an amplitude of the energy within the third wavelength band;

a fourth sensor having an input that receives energy within a fourth wavelength band of the flame, different from the first wavelength band, and an output that provides a fourth signal indicative of an amplitude of the energy within the fourth wavelength band, wherein the third wavelength band is chosen to be a predetermined band characterizing an efficient combustion process;

wherein the fourth wavelength band is chosen to be a predetermined band characterizing an efficient combustion process, and wherein the figure of merit further characterizes the combustion flame as a function of the third and fourth signals.

16. The system of claim 15, further comprising:

a fifth sensor having an input that receives energy within a fifth wavelength band of the flame within a visible region, and an output that provides a fifth signal indicative of an amplitude of the energy within the fifth wavelength band; and a sixth sensor having an input that receives energy within a sixth wavelength band of the flame within a visible region, and an output that provides a sixth signal indicative of an amplitude of the energy within the sixth wavelength band;

wherein the fifth wavelength band is a predetermined band characteristic of an inefficient combustion process;

wherein the sixth wavelength band is a predetermined band characteristic of an efficient combustion process;

wherein the third wavelength band is within an ultraviolet region; and wherein the flame characterization module receives the fifth signal and the sixth signal, and the figure of merit further characterizes the combustion flame as a function of the fifth and sixth signals.

17. The system of claim 16, further comprising a wavelength variation module having an input that receives the third signal, and an output that provides a measure of a change in flicker frequency of an amplitude variation, in the frequency domain, of the third signal, wherein the flame characterization module receives the measure of change in flicker frequency, and the figure of merit further characterizes the combustion flame as a function of the measure of change in flicker frequency.

18. The system of claim 16, further comprising an AC amplitude measurement module having an input that receives the third signal, and an output that provides a measure of an amount of AC amplitude variation of the third signal, wherein the flame characterization module receives the measure of the amount of AC amplitude variation, and the figure of merit further characterizes the combustion flame as a function of the measure of the amount of AC amplitude variation.

19. The system of claim 15, wherein the amplitude of energy of the third wavelength band is indicative of a first characteristic of the combustion flame that increases in response to an increase in temperature.

20. The system of claim 19, wherein the amplitude of energy of the fifth wavelength band is indicative of a second characteristic of the combustion flame representative of at least one of soot and unburned hydrocarbons.

21. The system of claim 9, in combination with a flame control system having an input that receives the figure of merit and an output that controls the combustion flame based upon the received figure of merit.

22. A method of characterizing a combustion flame, comprising:
(a) measuring an amplitude of energy within a first wavelength band of the flame, the first wavelength band indicative of an inefficient combustion process, and outputting a first signal representative of the measured amplitude of energy;
(b) measuring an amplitude of energy within a second wavelength band of the flame, the second wavelength band indicative of an efficient combustion process and different from the first wavelength band, and outputting a second signal indicative of the measured amplitude of energy; and
(c) determining a figure of merit to characterize the combustion flame as a function of at least a ratio of the first and second signals;
wherein the first wavelength band includes a wavelength of 2200 nm.

23. The method of claim 22, wherein the step (a) of measuring includes measuring at least one characteristic of the combustion flame indicative of at least one of soot and unburned hydrocarbons.

24. The method of claim 22, further comprising a step of controlling the combustion flame based upon the figure of merit.

25. The method of claim 22, further comprising:
(d) measuring an amplitude of energy within a third wavelength band within an ultraviolet region of the flame, the third wavelength band indicative of an efficient combustion process, and outputting a third signal indicative of the measured amplitude of energy;
(e) measuring an amplitude of energy within a fourth wavelength band within a visible region of the flame, the fourth wavelength band indicative of an efficient combustion process, and outputting a fourth signal indicative of the measured amplitude of energy;

wherein the first wavelength band is within an infrared region; and
wherein step (c) includes determining the figure of merit further as a function of the amplitude of energy within the third wavelength band and the amplitude of energy within the fourth wavelength band.

26. The method of claim 25, wherein the step (d) of measuring includes measuring at least one characteristic of the combustion flame that increases in response to an increase in a temperature.

27. The method of claim 25, further comprising measuring a frequency of amplitude variation of the third signal, wherein step (c) includes determining the figure of merit further as a function of the frequency of amplitude variation of the third signal.

28. The method of claim 25, further comprising a step of measuring an amount of AC amplitude variation of the third signal, wherein step (c) includes determining the figure of merit further as a function of the amount of AC amplitude variation of the third signal.

29. The method of claim 22, wherein the second wavelength band includes a wavelength of 1880 nm.

30. The method of claim 29, further comprising:
(d) measuring an amplitude of energy within a third wavelength band within an ultraviolet region of the flame, the third wavelength band indicative of an efficient combustion process, and outputting a third signal indicative of the measured amplitude of energy;
(e) measuring an amplitude of energy within a fourth wavelength band within a visible region of the flame, the fourth wavelength band indicative of an efficient combustion process, and outputting a fourth signal indicative of the measured amplitude of energy;
wherein the first wavelength band is within an infrared region; and
wherein step (c) includes determining the figure of merit further as a function of the amplitude of energy within the third wavelength band and the amplitude of energy within the fourth wavelength band.

31. The method of claim 30, wherein the step (d) of measuring includes measuring least one characteristic of the combustion flame that increases in response to an increase in temperature.

32. The method of claim 30, further comprising measuring a frequency of amplitude variation of the third signal, wherein step (c) includes determining the figure of merit further as a function of the frequency of amplitude variation of the third signal.

33. The method of claim 30, further comprising a step of measuring an amount of AC amplitude variation of the third signal, wherein step (c) includes determining the figure of merit further as a function of the amount of AC amplitude variation of the third signal.

34. An apparatus for characterizing a combustion flame, comprising:
first means for measuring an amplitude of energy within a first wavelength band of the flame, the first wavelength band indicative of an inefficient combustion process, and for outputting a first signal indicative of the measured amplitude of energy;
second means for measuring an amplitude of energy within a second wavelength band of the flame, the second wavelength band indicative of an efficient combustion process and different from the first wavelength band, and for outputting a second signal indicative of the measured amplitude of energy; and determining means for determining a figure of merit to characterize the combustion flame as a function of at least a ratio of the first and second signals, wherein the first wavelength band includes a wavelength of 2200 nm.

35. The apparatus of claim 34, wherein the second wavelength band includes a wavelength of 1880 nm.

36. The apparatus of claim 34, further comprising means for controlling the combustion flame based upon the figure of merit.

37. The system as recited in claim 34 further comprising:

third means for receiving energy within a third wavelength band of the flame, and for outputting a third signal indicative of an amplitude of the energy within the third wavelength band;

fourth means for receiving energy within a second wavelength band of the flame, different from the first wavelength band, and for outputting a fourth signal indicative of an amplitude of the energy within the fourth wavelength band, wherein the third wavelength band is chosen to be a predetermined band characterizing an efficient combustion process, wherein the fourth wavelength band is chosen to be a predetermined band characterizing an efficient combustion process, and wherein the figure of merit further characterizes the combustion flame as a function of the third and fourth signals.

38. The apparatus of claim 37, further comprising:

fifth means for measuring an amplitude of energy within a fifth wavelength band within a visible region of the flame OH, the fifth wavelength band indicative of an efficient combustion process, and outputting a fifth signal indicative of the measured amplitude of energy;

sixth means for measuring an amplitude of energy within a sixth wavelength band within a visible region of the flame, the sixth wavelength band indicative of an efficient combustion process, and outputting a sixth signal indicative of the measured amplitude of energy;

wherein the third wavelength band is within an ultraviolet region, and wherein the determining means include means for determining the figure of merit further as a function of the fifth and sixth signals.

39. The apparatus of claim 37, further comprising means for measuring a change in flicker frequency of an amplitude variation, in the frequency domain, of the third signal, wherein the determining means include means for determining the figure of merit further as a function of the frequency of amplitude variation of the third signal.

40. The apparatus of claim 37, further comprising means for measuring an amount of AC amplitude variation of the third signal, wherein the determining means include means for determining the figure of merit further as a function of the amount of AC amplitude variation of the third signal.

41. The apparatus of claim 37, wherein the figure of merit includes a ratio between the third signal and the fourth signal.

42. The apparatus of claim 37, wherein the third means include means for measuring at least one characteristic of the combustion flame that increases in response to an increase in temperature.

43. The apparatus of claim 37, wherein the fourth means include means for measuring at least one characteristic of the combustion flame indicative of at least one of soot and unburned hydrocarbons.

* * * * *